(12) United States Patent
Yu et al.

(10) Patent No.: US 11,321,953 B2
(45) Date of Patent: May 3, 2022

(54) METHOD AND APPARATUS FOR POSTURE, DIMENSION AND SHAPE MEASUREMENTS OF OBJECTS IN 3D SCENES

(71) Applicant: Hong Kong Applied Science and Technology Research Institute Company Limited, Hong Kong (CN)

(72) Inventors: Hoi Fai Yu, Hong Kong (CN); Xueyan Tang, Hong Kong (CN); Meng Chen, Yong Xiu (CN)

(73) Assignee: HONG KONG APPLIED SCIENCE AND TECHNOLOGY RESEARCH INSTITUTE COMPANY LIMITED, Hong Kong (CN)

(*) Notice: Subject to any disclaimer, the term of this patent is extended or adjusted under 35 U.S.C. 154(b) by 248 days.

(21) Appl. No.: 16/830,206

(22) Filed: Mar. 25, 2020

(65) Prior Publication Data

US 2021/0303822 A1    Sep. 30, 2021

(51) Int. Cl.
*G06K 9/00* (2022.01)
*G06V 20/64* (2022.01)
(Continued)

(52) U.S. Cl.
CPC .............. *G06V 20/64* (2022.01); *G06T 17/00* (2013.01); *G06V 10/44* (2022.01); *G06T 2210/56* (2013.01); *G06V 2201/07* (2022.01)

(58) Field of Classification Search
CPC ............ G06K 9/00201; G06K 9/4604; G06K 2209/21; G06K 9/6215; G06T 17/00;
(Continued)

(56) References Cited

U.S. PATENT DOCUMENTS 8,830,229 B2    9/2014   Drost et al.
9,472,022 B2   10/2016   Neumann et al.
(Continued)

FOREIGN PATENT DOCUMENTS

CN    104050709 A    9/2014
CN    109325998 A    2/2019

OTHER PUBLICATIONS

Vo, Anh-Vu, et al. "Octree-based region growing for point cloud segmentation." ISPRS Journal of Photogrammetry and Remote Sensing 104 (2015): 88-100. (Year: 2015).*
(Continued)

*Primary Examiner* — Andrew M Moyer
(74) *Attorney, Agent, or Firm* — Eagle IP Limited; Jacqueline C. Lui

(57) ABSTRACT

Computer implemented methods and computerized apparatus for posture, dimension and shape measurements of at least one 3D object in a scanned 3D scene are provided. The method comprises receiving a point cloud and performs 3D geometric feature extraction. In one embodiment, the 3D geometric feature extraction is based on a 3D hybrid voxel-point structure, which comprises a hybrid voxel-point based normal estimation, a hybrid voxel-point based plane segmentation, a voxel-based geometric filtering, a voxel-based edge detection and a hybrid voxel-point based line extraction. Through the process of 3D geometric feature extraction, the geometric features are then passed to the geometric-based dimension and shape measurements for various applications. After 3D geometric feature extraction, a further process of feature-based object alignment is performed. According to one embodiment of the present invention, using the exact lines extracted from the 3D geometric feature extraction, the computerized apparatus generates line-to-line (L2L) pair features for each identified object in
(Continued)

the 3D scene. The L2L pair features in turn is used for aligning the identified 3D objects with target 3D objects.

16 Claims, 18 Drawing Sheets

(51) Int. Cl.
*G06T 17/00* (2006.01)
*G06V 10/44* (2022.01)

(58) Field of Classification Search
CPC ....... G06T 2210/56; G06T 7/11; G06T 7/149; G06T 7/187; G06T 7/73; G06T 2207/10028; G06T 2207/30164; G06V 20/64; G06V 10/44; G06V 2201/07
USPC ......................................................... 382/154
See application file for complete search history.

(56) References Cited

U.S. PATENT DOCUMENTS

| | | |
|---|---|---|
| 2015/0009214 A1 | 1/2015 | Lee et al. |
| 2016/0299997 A1 | 10/2016 | Mitchell et al. |
| 2018/0218510 A1 | 8/2018 | Taguchi et al. |
| 2019/0049242 A1* | 2/2019 | Adams .................... G01S 17/87 |
| 2020/0013215 A1 | 1/2020 | Vosoughi et al. |

OTHER PUBLICATIONS

C. Choi, Y. Taguchi, O. et, al., Voting-based pose estimation for robotic assembly using a 3D sensor, IEEE International Conference on Robotics and Automation, Saint Paul, MN, 2012, pp. 1724-1731, doi: 10.1109/ICRA.2012.6225371.

Poux, F.; Billen, R. Voxel-based 3D Point Cloud Semantic Segmentation: Unsupervised Geometric and Relationship Featuring vs Deep Learning Methods. ISPRS Int. J. Geo-Inf. 2019, 8, 213.

* cited by examiner

METHOD AND APPARATUS FOR POSTURE, DIMENSION AND SHAPE MEASUREMENTS OF OBJECTS IN 3D SCENES

FIELD OF INVENTION

This invention relates generally to three-dimensional (3D) object recognition, and in particular, to methods and apparatus for posture, dimension and shape measurements of objects in 3D scenes.

BACKGROUND OF INVENTION 3D vision is becoming one of the top emerging markets that attracts a lot of attention in recent years. This technology has overwhelming advantages of providing complete information on a 3D physical space, giving rise to 3D metrology applications such as factory line automation, building construction, automotive enhancement, etc.

Traditionally, there are several common methods to conduct measurements in 3D scenes of different industries. For measurement of mechanical parts, local contact measurement is commonly used. However, this method is not able to obtain full profile of the mechanical parts, and the measurement is with limited resolution. Moreover, the processing speed is slow. Another method is to apply full geometric dimension measurement provided by the current commercial 3D scanning and measurement systems. However, such system can only provide an offline measurement, and the required processing time is far from inline productivity demand. Hence a new approach to perform geometric measurements of 3D objects accurately and efficiently is called for.

SUMMARY OF INVENTION

In the light of the foregoing background, alternate computer implemented methods and apparatus are provided for posture, dimension and shape measurements of at least one 3D object in a 3D scene.

According to an embodiment of the present invention, a computer implemented method for posture, dimension and shape measurements of at least one 3D object in a scanned 3D scene is provided. The method comprises receiving a point cloud of a scanned 3D scene, wherein the scanned 3D scene comprises at least one 3D object represented by a plurality of points in the point cloud. The method further comprises voxelizing the point cloud into a plurality of voxels of equal dimensions and classifying the plurality of voxels into a first category of voxels if they satisfy a planar requirement and a second category of voxels if they do not satisfy the planar requirement. For each voxel in the first category, the method computes at least one planar parameter of a plane that fits the points inside the voxel, and for each voxel in the second category, it computes the normal vector of each point in the voxel. The method further comprises growing at least one common plane for the plurality of voxels based on the computed at least one planar parameter of the first category voxels and the normal vector of each point in the second category voxels, and creates at least one projected voxel plane for each of the at least one common plane, wherein the at least one projected voxel plane comprises a plurality of projection voxels. The method further comprises performing edge detection on each of the at least one projected voxel plane to obtain edge projection voxels on each corresponding at least one projected voxel plane; extracting lines from the edge projection voxels in each of the at least one projected voxel plane; and connecting lines together to form an object for each of the at least one projected voxel plane for the posture, dimension and shape measurements of the 3D object in the scanned 3D scene.

According to another embodiment of the present invention, a computer implemented method for extracting geometric information from a point cloud is provided. The method comprises voxelizing the point cloud into a plurality of voxels of equal dimensions and classifying the plurality of voxels into a first category of voxels if they satisfy a first requirement and into a second category of voxels if they do not satisfy the first requirement. The first requirement comprises the following conditions: (a) the number of points inside the voxel is more than a pre-determined threshold and (b). the points inside the voxel exhibit a regular structure. The method further comprises extracting the regular structure from the first category voxels; merging the neighboring first category voxels together if their respective regular structures satisfy a second requirement to form at least one broad regular structure; associating each point in each second category voxel to one of its neighboring first category voxels if this point and the regular structure of its neighboring first category voxels yields the best local match; and outputting the at least one broad regular structure as the geometric information of the point cloud.

Accordingly, an example embodiment of the present invention relates to a computerized system comprising a processor and a memory coupled to the processor. The memory and the processor together are configured to cause the computerized system to perform actions according to the above embodiments.

The above example embodiments have benefits and advantages over conventional technologies such as local contact measurement and current 3D measurement solutions in market. For example, the current method is able to extract 3D features fast and align 3D objects accurately by using the algorithm described herein. Therefore, it fulfills inline metrology requirements through balancing between speed and accuracy of measurement results.

Another advantage of the present invention is that the computer implemented methods are capable for 3D measurements from a real-world scene in real-time and thus can be implemented on both PC and embedded chips.

Moreover, the computer implemented methods are compatible with different 3D sensors and can be applied in various applications for different industries such as in building construction or for high-precision microscopes.

BRIEF DESCRIPTION OF FIGURES

Through the following detailed description with reference to the accompanying drawings, the above and other features, advantages and aspects of embodiments of the present invention will become more apparent. In the drawings, identical or similar reference signs represent identical or similar elements, wherein.

DETAILED DESCRIPTION OF THE PREFERRED EMBODIMENTS

As used herein and in the claims, the term "comprising" means including the following elements but not excluding others. The term "based on" is to be read as "based at least in part on." The term "one example embodiment" and "an example embodiment" are to be read as "at least one example embodiment." The term "another embodiment" is to be read as "at least one other embodiment."

As used herein and in the claims, "a 3D object" refers to any actual object with a posture, dimension and a shape in a 3D space, which can be represented by a plurality of points in a point cloud of a scanned 3D scene. Accordingly, "a target 3D object" refers to a reference 3D object that the actual 3D objects are aimed to compare with. Similarly, 2D refers to two dimension and 1D refers to one dimension.

As used herein and in the claims, "couple" or "connect" refers to electrical coupling or connection either directly or indirectly via one or more electrical means unless otherwise stated.

The following example embodiments alone or in combination may be practiced to provide methods and systems for posture, dimension and shape measurements and object recognition of 3D objects in various applications for different industries such as in automation, building construction or for high-precision microscopes.

Figure 1:
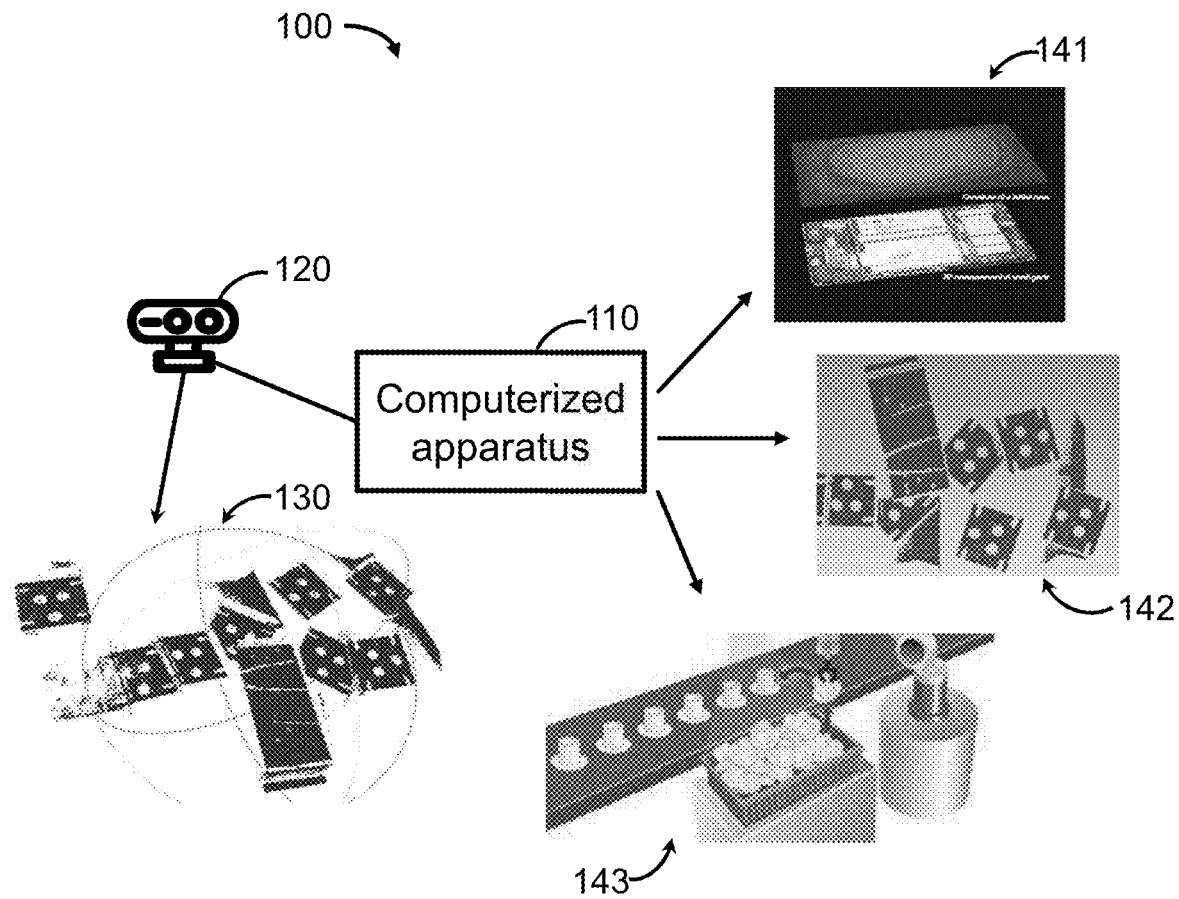
FIG. 1 illustrates a plurality of scenarios where embodiments of the present invention can be applied.

FIG. 1 show a diagram 100 illustrating a plurality of scenarios where embodiments of the present invention can be applied. In the plurality of scenarios, a computerized apparatus 110 is provided for posture, dimension and shape measurements and object recognition of at least one 3D object in a scanned 3D scene 130. The 3D scene 130 may be any scene in a physical environment, which includes one or more physical objects with dimensions and shapes.

One or more 3D sensors 120 are positioned to capture the 3D vision of the 3D scene 130 and coupled with the computerized apparatus 110 to provide 3D data of the 3D scene 130 to the computerized apparatus 110. The computerized apparatus 110 processes the 3D data for different applications (e.g., applications 141-143), as will be described below in detail.

Exemplary 3D sensors that can be used herein include, but are not limited to, 3D scanners, digital cameras, and other types of devices that are capable of capturing images of a real-world object and/or scene to collect data on its position, location, and appearance. Depending on the applications, the computerized apparatus 110 may be standalone computer(s) or embedded system(s), including, but not limited to, a laptop computer, a desktop computer, a tablet computer, a smart phone, an internet appliance, an embedded devices, or the like. The 3D sensor 120 may be physically separate with the computerized apparatus 110, or collocated with or embedded into the computerized apparatus 110.

In the diagram 100, application 141 is shown as a 3D measurement of actual parts of a mobile phone tablet. In this embodiment, the 3D sensor 120 captures the 3D scene of the mobile phone tablet. Based on the 3D data provided by the 3D sensor 120, the computerized apparatus 110 extracts 3D geometric features of parts in the tablet, and performs geometric-based dimension and shape measurements for each part.

Application 142 in the diagram 100 is shown as recognizing certain type of objects among a plurality of different objects. In this embodiment, the 3D sensor 120 captures the 3D scene including the plurality of different objects. Based on the 3D data provided by the 3D sensor 120, the computerized apparatus 110 extracts 3D geometric features of the plurality of different objects, and performs object recognition and alignment for comparative dimension and shape measurements to identify certain type of objects among a plurality of different objects.

Application 143 in the diagram 100 is shown as a robot picking application. In this embodiment, the 3D sensor 120 captures the 3D scene of a part tray containing a plurality of parts. Based on the 3D data provided by the 3D sensor 120, the computerized apparatus 110 extracts 3D geometric features of the plurality of parts, and performs object alignment to obtain the posture (location and orientation) of parts, and then coordinates the robot arm to pick up each part.

Figure 2:
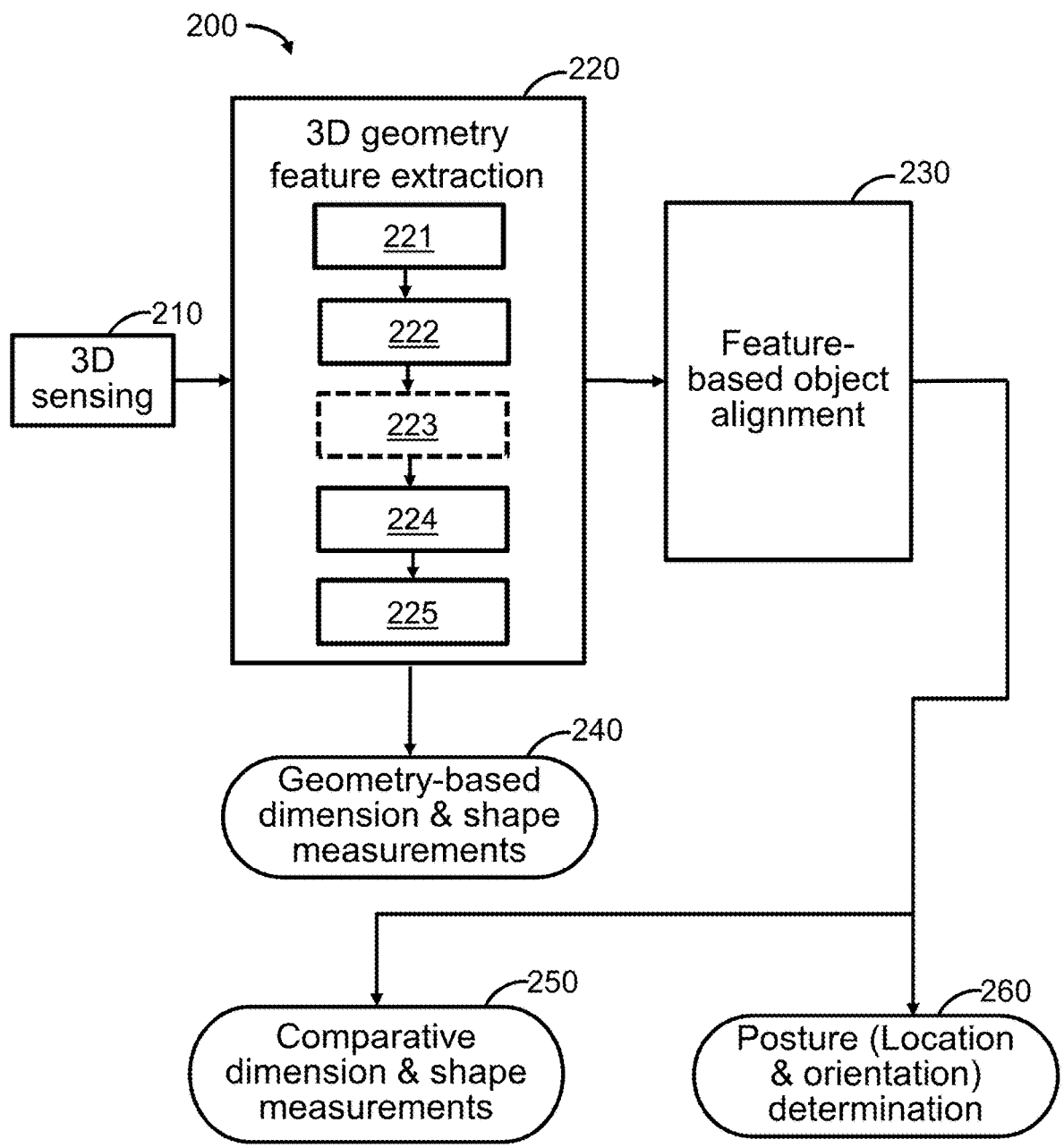
FIG. 2 shows a process according to embodiments of the present invention in several applications in connection with the scenarios represented in FIG. 1.

Referring now to FIG. 2, a diagram 200 shows a process according to embodiments of the present invention in several applications in connection with the scenarios represented in FIG. 1.

At block 210, 3D sensing is performed, for example through one or more 3D sensors 120, to generate a point cloud of the scanned 3D scene. Each object in the 3D scene is represented by a large number of points in the 3D space covering the surfaces of the 3D object.

At block 220, a computerized apparatus, such as the computerized apparatus 110, receives the point cloud and performs 3D geometric feature extraction. In one embodiment, the 3D geometric feature extraction is based on a 3D hybrid voxel-point structure, which comprises a hybrid voxel-point based normal estimation 221, a hybrid voxel-point based plane segmentation 222, a voxel-based geometric filtering 223, a voxel-based edge detection 224 and a hybrid voxel-point based line extraction 225. In some embodiments, the voxel-based geometric filtering 223 can be omitted. Through the process of 3D geometric feature extraction, the geometric features such as edges and lines of the 3D objects in the 3D scene are identified. They are then passed to the geometric-based dimension and shape measurements at block 240 for various applications. Details for the 3D geometric feature extraction according to the present invention will be discussed below.

After 3D geometric feature extraction, a further process of feature-based object alignment at block 230 is performed. According to one embodiment of the present invention, using the exact lines extracted from the 3D geometric feature extraction, the computerized apparatus generates line-to-line (L2L) pair features for each identified object in the 3D scene. The L2L pair features in turn is used for aligning the identified 3D objects with target 3D objects.

From the process of object alignment 230, a location and an orientation of an identified 3D object are obtained. At block 260, location and orientation conversion are performed for various applications, such as for application 143 where the robot arm uses these information to locate and pick up the identified 3D object in the part tray.

As a result of the process of object alignment, at block 250, a comparative dimension and shape measurement is further applied on the aligned objects. According to one embodiment of the present invention, a rotation and a translation from an actual object to its target object are computed. In other words, the posture of the actual object is estimated. Then the differences between the target object and the rotated and translated actual object are computed, which enables applications based on comparative measurements.

Figure 3:
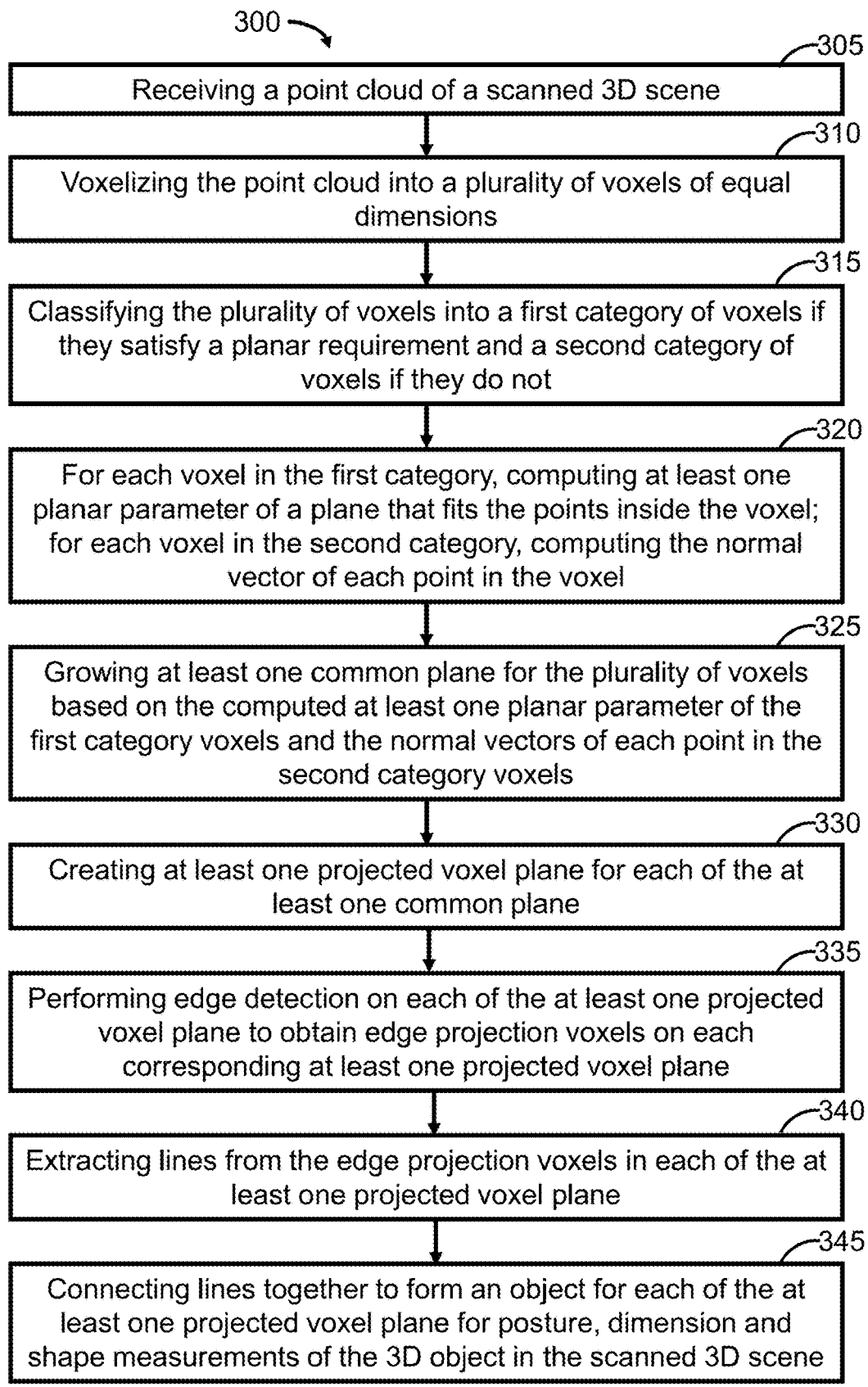
FIG. 3 is a flowchart of a method for posture, dimension and shape measurements of at least one 3D object in a scanned 3D scene according to an embodiment of the present invention.

FIG. 3 is a flowchart of a method 300 for posture, dimension and shape measurements of at least one 3D object in a scanned 3D scene according to an embodiment of the present invention. The method 300 may be implemented by for example the computerized apparatus 110 as shown in FIG. 1.

At 305, the computerized apparatus receives or obtains a point cloud of a scanned 3D scene. The scanned 3D scene comprises at least one 3D object represented by a plurality of 3D points in the point cloud. The point cloud may be produced by a 3D sensor and transferred to the computerized apparatus by various ways, either wirelessly, or by wire externally or internally.

It is worthy to note that the point cloud may be formed in a certain data format and structure to facilitate computerized proceedings. The present invention does not put any limitation in this regard.

At 310, the computerized apparatus voxelizes the point cloud into a plurality of voxels of equal dimensions. In the course of this voxelization, a voxel size is calculated, then the point cloud is partitioned in a 3D space into voxels with the same voxel size (i.e. with equal dimension). In an embodiment, a voxel size is determined based on the setting(s) of the 3D sensor. In another embodiment, depending at least on the point distribution within the point cloud and the granularity or precision that a measurement application requires, a voxel size is determined by a human operator to ensure that there are enough points in voxels for the 3D object measurements.

At 315, the plurality of voxels is classified into a first category of voxels if they satisfy a planar requirement and a second category of voxels if they do not satisfy the planar requirement. The planar requirement defines conditions whether the points within the voxel exhibits a 2D planar structure within the 3D space. This planar structure is represented by at least one planar parameter which may consist of a normal vector and additionally an offset. In one embodiment, the offset is obtained from the mean value of all the points within this voxel.

Then at 320, for each voxel in the first category, the at least one planar parameter of the 2D plane that fits the points inside the voxel is computed; and for each voxel in the second category, the normal vector of each point in the voxel is computed.

At 325, based on the computed at least one planar parameter of the first category voxels and the normal vector of each point in the second category voxels, at least one common plane for the plurality of voxels is grown. Each common plane has a planar structure and may cover one or more first category voxels and some points of zero or more second category voxel. Furthermore, all points within a common plane are well fitted to the planar parameters defining that common plane. In this way of growing, each common plane may associate with a particular 3D object in the scanned 3D scene.

At 330, for each of the at least one common plane, a corresponding projected voxel plane is created. For each common plane grown at 325, the 3D voxel data associated with this common plane is projected onto a 2D projected voxel plane which is perpendicular to the computed normal vector of this common plane, to obtain a projected voxel plane. Thus every 3D point in the common plane is represented by a 2D point in the projected voxel plane.

Additionally, each projected voxel plane is voxelized in the 2D plane into a plurality of projection voxels. These projection voxels may have a same size. With the process of projection and voxelization, data of 3D space is mapped to 2D data structure and the speed of measurements may be significantly increased.

At 335, edge detection is performed on each of the at least one projected voxel plane to obtain edge projection voxels on each corresponding at least one projected voxel plane.

At 340, lines are extracted from the edge projection voxels in each of the at least one projected voxel plane.

At 345, lines are connected together to form an object for each of the at least one projected voxel plane for posture, dimension and shape measurements of the 3D object in the scanned 3D scene.

It will be noted that, though the operations are described above in a specific order, the operations are not necessarily performed following the above particular order. For example, some operations may be performed in a multi-task manner or in parallel.

Figure 4:
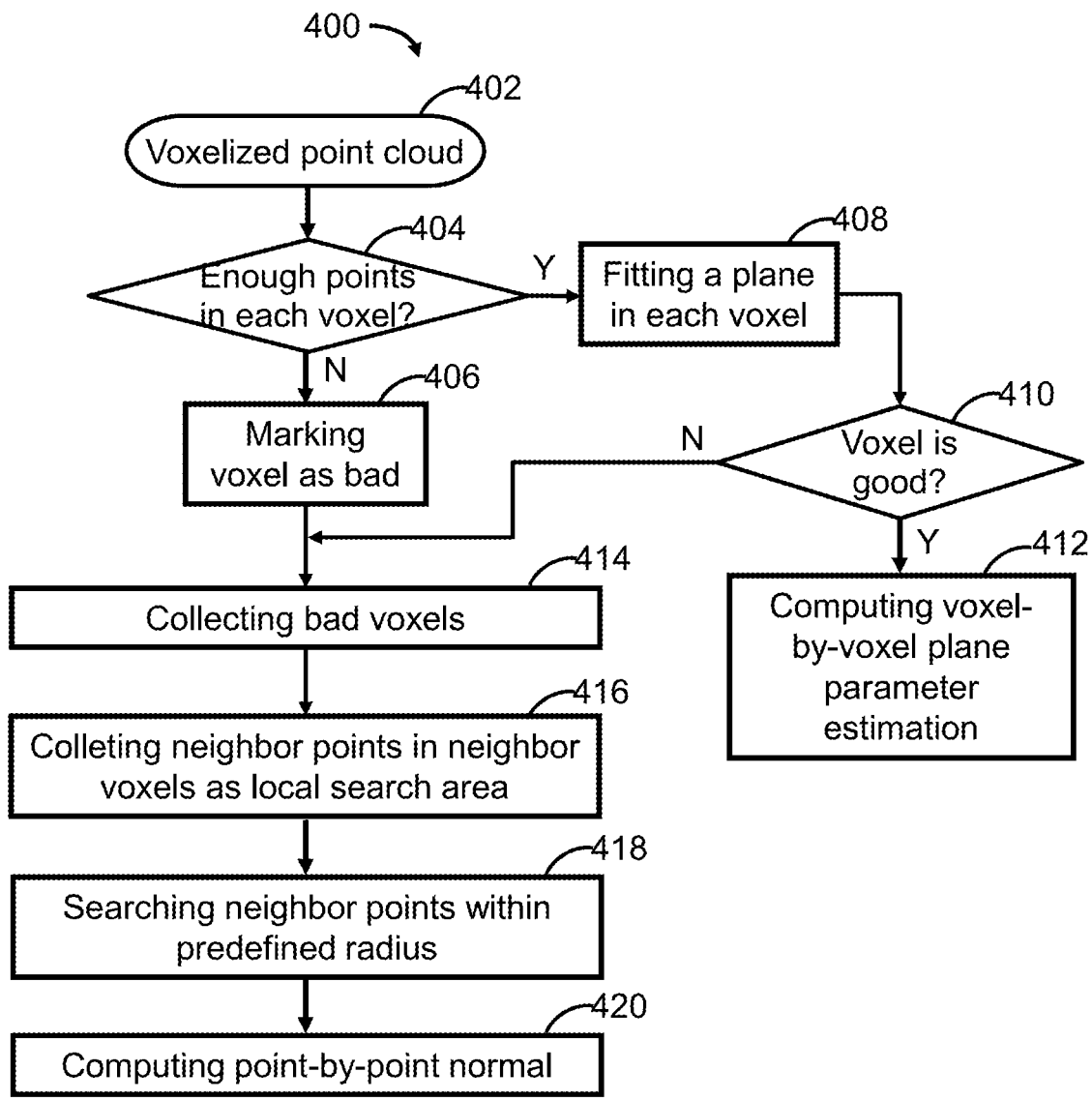
FIG. 4 is a flowchart of a method of hybrid voxel-point-based normal estimation according to an embodiment of the present invention.
Figure 5:
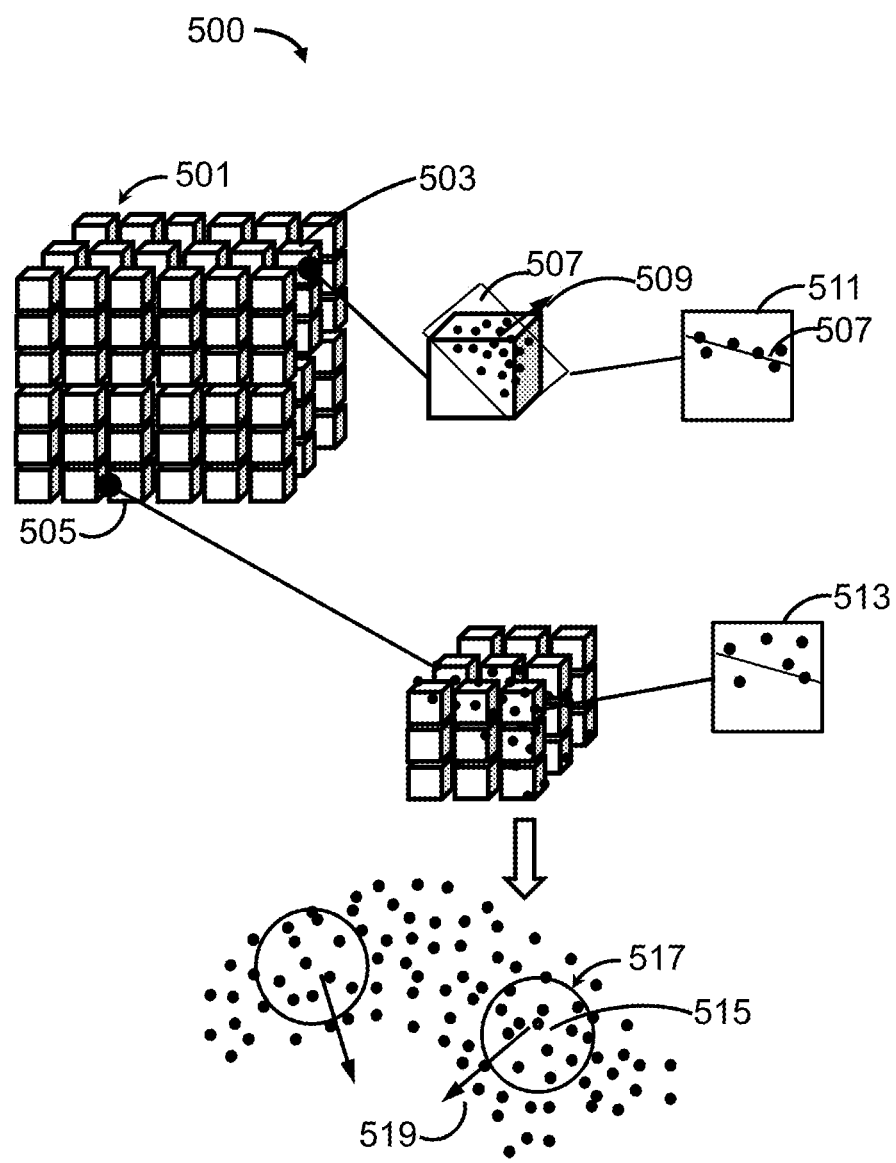
FIG. 5 illustrates a process of hybrid voxel-point-based normal estimation according to an embodiment of the present invention.

FIG. 4 shows a flowchart of a method 400 and FIG. 5 illustrates a process 500 for hybrid voxel-point-based normal estimation according to an embodiment of the present invention. The method 400 and the process 500 provide an exemplary implementation of the above steps of 315 and 320. They will be described below in connection with these steps.

After the point cloud is voxelized, at 402, the method 400 starts with inputted voxelized point cloud. At steps of 404-410, based on the planar requirement stated at 315, each voxel in the voxelized point cloud is classified into a first category or a second category. In this embodiment, a first category of voxels namely refer to good voxels and a second category of voxels namely refer to bad voxels.

In one embodiment of the present invention, the planar requirement stated at 315 comprises a first condition where the number of points inside the voxel is more than a first predefined threshold, and a second condition whether the 3D points inside the voxel exhibit a planar structure. The determination whether the points inside a voxel exhibit a planar structure may depend on measurement requirement of a particular applications.

In the exemplary implementation of method 400, at 404, whether there are enough points in each voxel is determined. If there are not enough points in a voxel, at 406, this voxel is marked as bad. On the other hand, if there are enough points in a voxel, at 408, a plane is constructed based on all the points within this voxel. In one embodiment, the mean value of these points, as well as the corresponding eigenvalues and eigenvectors are computed. Based on these computed results, a plane that best fits these data points is obtained.

Afterwards, a measure of fitness between this plane and these 3D data points is evaluated at 410. In one embodiment, the fitness measure is a mean squared error (MSE) measure. It represents the average distance between each point in the voxel and the fitted plane. If the MSE in a single voxel is less than a first specified threshold, this voxel is determined to meet with the second condition of the planar requirement which indicates that the points exhibits a planar structure. For a measurement application in building structure, the first pre-defined threshold may be a few millimeters. For high precision applications such as microscopic measuring, it may be a few nanometers.

In another embodiment, additionally or alternatively if a weighted MSE of a plane merged by neighbors is less than one threshold and their normal vector difference between the fitted plane and current voxel is less than another threshold, this voxel is determined to meet with the second condition of the planar requirement.

Hence at 410, if the voxel meets the planar requirement, then it is classified as a good voxel and control is passed to step 412, otherwise, it is considered as a bad voxel and control is passed to step 414.

At 412, the planar parameters of this good voxel are obtained based on the eigenvalues, eigenvectors and the mean value computed previously. In one embodiment, the planar parameters consist of a normal vector and an offset.

Voxels marked as bad are collected at 414. In a 3D space, a bad voxel may have 26 neighbor voxels. At 416, all the points in the 26 neighbor voxels of a bad voxel and the other points in this bad voxel are collected, and as a result these neighbor points form a local search area for a respective bad voxel.

At 418, for each point in a bad voxel, a searching process is conducted for neighbor points within a predefined radius in its corresponding local search area. The scale for the determination of a point's neighborhood (i.e., the predefined radius) may be selected based on the level of detail required by the application.

At 420, a normal vector is computed for each point in bad voxels. In one embodiment, this single point normal is obtained based on the eigenvalues and eigenvectors computed using the neighbor points within the predefined radius.

In a way of hybrid voxel-point-based normal estimation as described above, a good balance between processing speed and measurement accuracy is achieved. Table 1 below shows the performance improvement of the hybrid voxel-point-based normal estimation according to the present invention.

TABLE 1

Performance comparisons for normal estimation

| Volume of points | PCL | Open3D | the present invention |
|---|---|---|---|
| 320,000 | 2.309 s | 0.490 s | 0.219 s |
| 40,000 | 0.171 s | 0.075 s | 0.031 s |
| 437,000 | 5.416 s | 0.700 s | 0.460 s |

The above performance comparisons against the PCL (Point Cloud Library) package and the Open3D package are executed on a computer employing an 8-core i7 Intel processor running at 2.8 GHz frequency and using 16G RAM. It shows that, using the method of the present invention, the processing speed is significantly reduced. Compared with PCL, the processing speed is 10 times faster for a larger volume of points, and compared with Open3D, the processing speed is 2 times faster.

From a visual perspective, FIG. 5 illustrates a process 500 for hybrid voxel-point-based normal estimation according to an embodiment of the present invention. As shown in FIG. 5, a point cloud or a part of a point cloud where a 3D scene including 3D object(s) in a 3D space 501 is voxelized into a number of voxels with equal dimension, such as voxel 503 and voxel 505.

Voxel 503 contains enough number of points, and these points exhibit a planar structure 507. In the event that the points inside the voxel 503 further embody the voxel 503 good enough as shown by 511, the normal vector 509 of the plane 507 is computed.

On the other hand, voxel 505 may not contain enough points or the points inside the voxel 505 do not embody it good enough as shown by 513. In this case, for each point in the voxel 505, a local search area is found and a point-by-point normal vector is computed based on each local search area as described above. As an example, point 515 is in the bad voxel 505. To estimate its normal vector, the neighbor points within a radius 517 are searched, and its normal vector 519 is computed based on the points within the radius 517.

After the point cloud is processed with the process 500, a respective plane and its planar parameters are obtained for each voxel of a first category, and a normal vector for each point in a voxel of a second category is computed.

Figure 6:
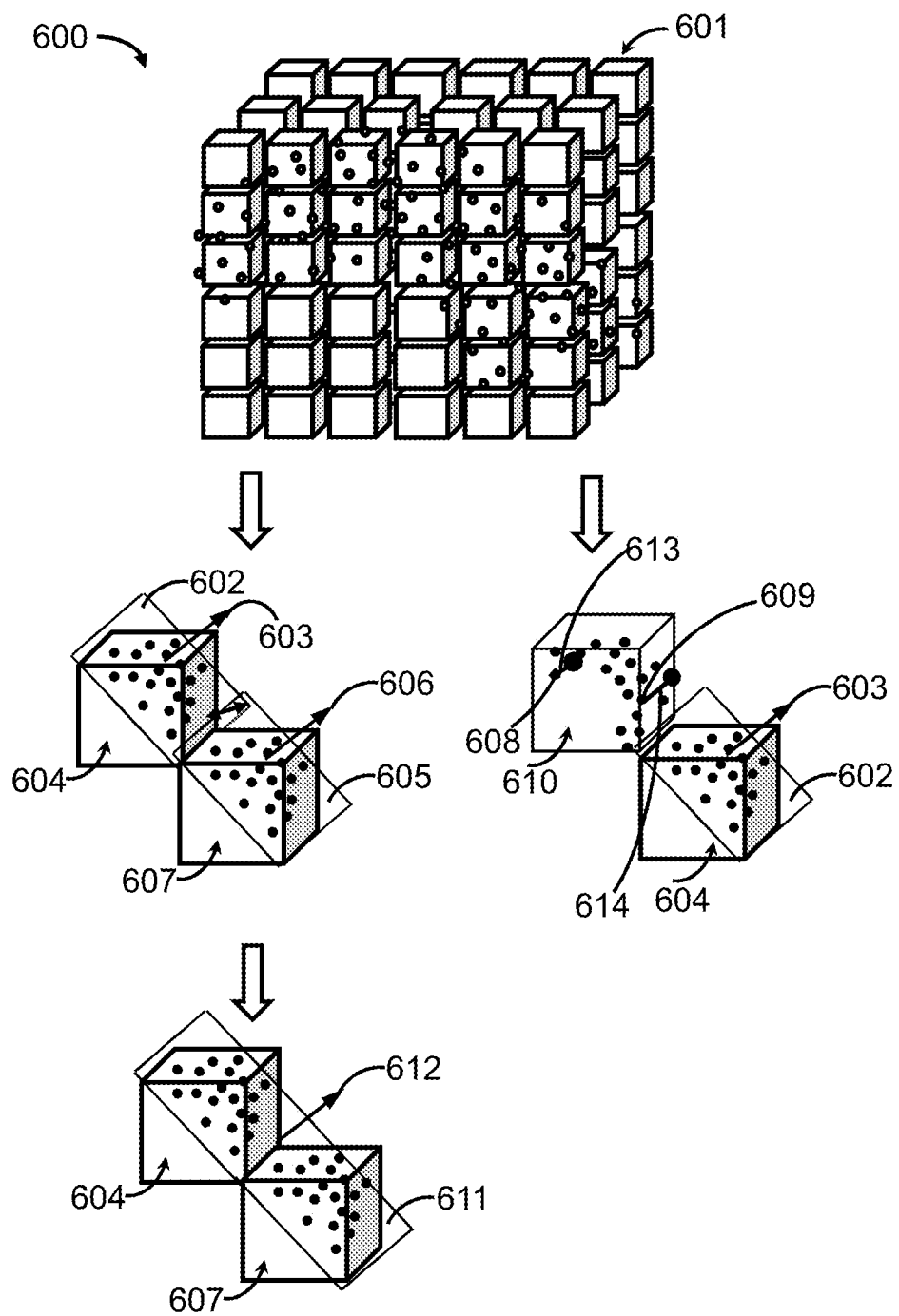
FIG. 6 illustrates a process of hybrid voxel-point-based plane segmentation according to an embodiment of the present invention.

FIG. 6 illustrates a process 600 of a hybrid voxel-point-based plane segmentation according to an embodiment of the present invention. The process 600 provides an exemplary implementation of the above step 325.

A number of voxels with equal dimension containing a point cloud where a 3D scene including 3D object(s) in a 3D space 601 are classified into first category voxels and second category voxels. With the process 500, the respective planes and the normal vectors of the first category voxels, such as plane 602 and normal vector 603 of the voxel 604 and plane 605 and normal vector 606 of the voxel 607, are obtained. Each of these planes in the 3D space 601 comprises a normal vector and an offset. The normal vectors of points in the second category voxels are also computed, such as a normal vector of point 608 and a normal vector of point 609 in the voxel 610.

In the process 600, those neighboring voxels in the first category are merged to form at least one common plane if the neighboring voxels satisfy a plane-to-plane requirement. In one embediment, the plane-to-plane requirement comprises a first condition where the normal vectors of the neighboring first category voxels are proximately equal, and a second condition where the absolute difference of their offsets is smaller than a second predefined threshold.

As an example, the normal vector 603 of plane 602 and the normal vector 606 of plane 605 are proximately equal, and a difference of the two offsets is small enough, compared to the second predefined threshold. In this event the two voxels are merged to form a common plane 611. Accordingly, the normal vector 612 and the offset of the common plane 611 are re-calculated.

For each voxel in the second category, each point in this voxel is associated to one of the neighboring first category voxels if this point and that neighboring first category voxel yields the best point-to-plane match. Specifically, for each point in each second category voxel, first category voxels in the neighborhood of this second category voxel are identified as neighbor voxels. Then the planes of the neighbor voxels are retrieved as neighbor planes, and the point is associated to one of the neighbor planes if that specific neighbor plane yields the best point-to-plane match.

In one embodiment, the point-to-plane match is a function of the distance of a point to a plane and the proximity of the normal vector of the point against the normal vector of the plane.

As an example, a bad voxel 610 may have one or more neighboring first category voxels, such as a first category voxel 604. Accordingly there are one or more neighboring first category voxels that point 608 and point 609 in the voxel 610 may establish neighboring relationships with. In this embodiment, only if the neighboring relationship represents a best point-to-plane match, an association between the point 608 or 609 in a second category voxel and a neighboring voxel of a first category can be created.

In the example of the process 600, the normal vector of point 608 (not shown) is approximately equal to the normal vector 603 of plane 602 which is fitted for one of its neighboring good voxels (e.g., voxel 604). Meanwhile the distance 613 of point 608 to the plane 602 is smaller than a threshold and is the least distance between point 608 and those other planes of neighboring good voxels. As a result, point 608 is associated with voxel 604.

Point 609 has a quite different normal vector with that of the plane 602, or even if the normal vector of point 609 (not shown) is approximately equal to the normal vector 603 of plane 602, but the distance 614 of point 609 to the plane 602 does not yield the best point-to-plane match, then point 609 will not be associated with voxel 604. It may otherwise be associated with another good voxel if it meets the best point-to-plane match.

With the process 600 of hybrid voxel-point-based plane growing, a plurality of voxels in a point cloud may be associated with one or more common planes (i.e., merged planes), each of which may be associated with a particular 3D object in the scanned 3D scene. The voxel and point based growing can be performed parallel. When compared with PCL, growing 14 planes for 100,000 points at the same circumstances, the processing speed is improved from 2.319 s to 0.219 s, which is over 10 times faster.

Figure 7:
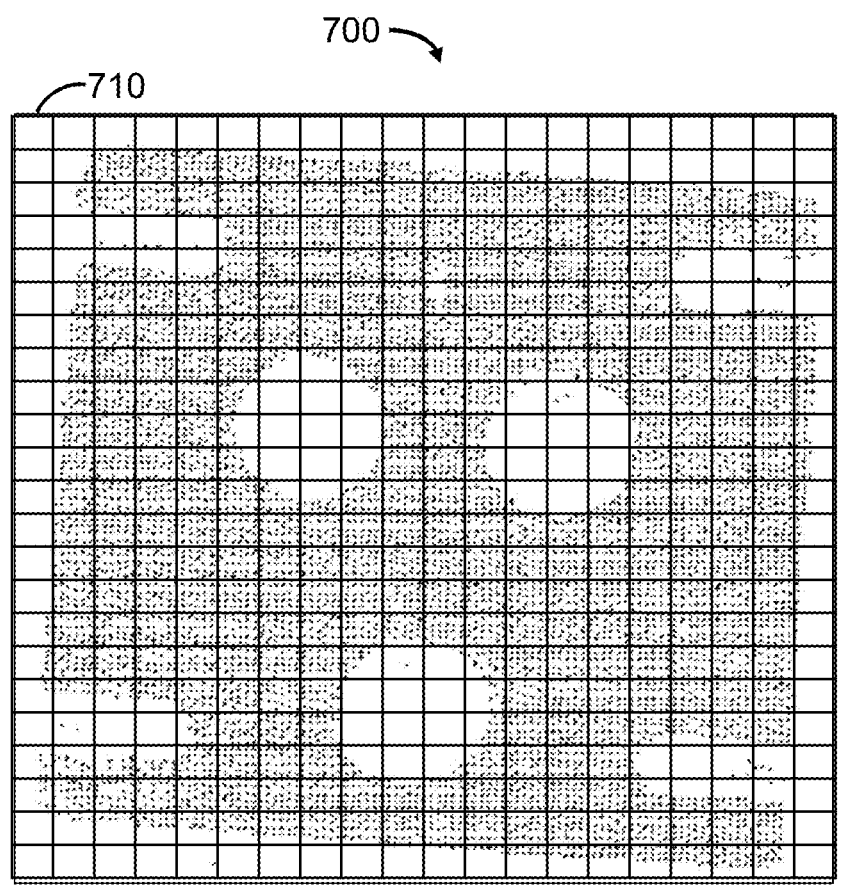
FIG. 7 illustrates a 2D projection plane for a merged plane according to an embodiment of the present invention, where some geometric features describing the projection plane are shown.

FIG. 7 is a diagram 700 of a 2D projection plane 710 for a common plane according to an embodiment of the present invention, where some geometric features describing the projection plane are shown.

According to an embodiment of the present invention, each common plane grown through the process 600 associates with a number of points in the point cloud. The voxel data associated with this common plane is projected perpendicular with the computed normal vector of this common plane, to obtain a 2D projection plane 710 within which points from the voxels associated with this common plane are projected.

Further, each 2D projection plane 710 may be voxelized in the 2D plane into a plurality of projection voxels. These projection voxels may have a same size as shown in FIG. 7. In this sense, the 2D projection plane 710 is transformed to a projected voxel plane.

In one embodiment, in order to facilitate a faster comparative dimension and shape measurement or to enable an application based on target 3D objects, a geometric filter may be applied to the projected voxel planes derived from the point cloud of a 3D scene, to filter out unwanted portion of the scanned 3D scene that does not include the target 3D object. The filtering may be applied by examining each projected voxel plane and eliminating those projected voxel planes that do not satisfy geometric features related to the target 3D objects.

A projected voxel plane of a target 3D object may be obtained or computed as a 2D target projected plane for the filtering. The geometric features describing the projected voxel planes may include the number of occupied projection voxels. For each projected voxel plane, the number of projection voxels being occupied by projected points is counted, as well as the number of projection voxels being occupied by projected points in the 2D target projected plane. Here a projection voxel being occupied may refer to the number of associated points inside it exceeding a pre-specified threshold. By comparing these counts, those mostly likely being not target 3D objects are filtered out. By counting the projection voxels, the unwanted objects in the 3D scene can be quickly filtered out.

Figure 8:
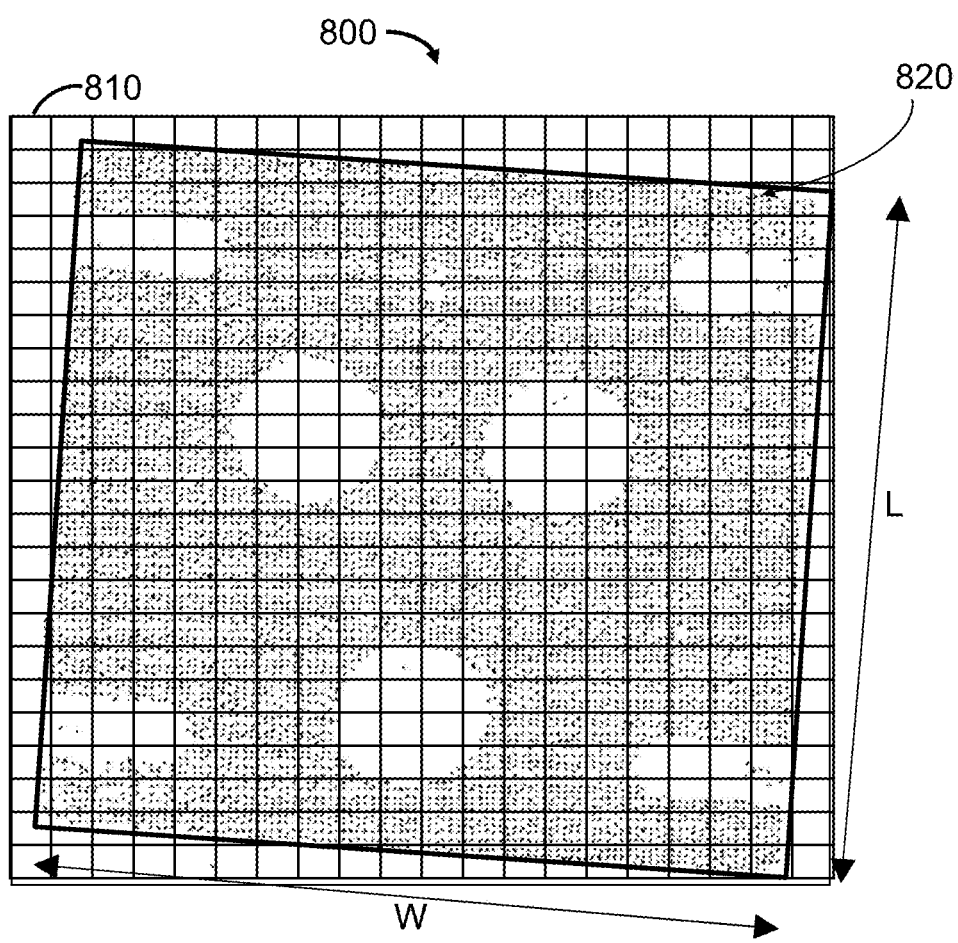
FIG. 8 illustrates a 2D projection plane for a merged plane with some geometric features according to an embodiment of the present invention.
Figure 9:
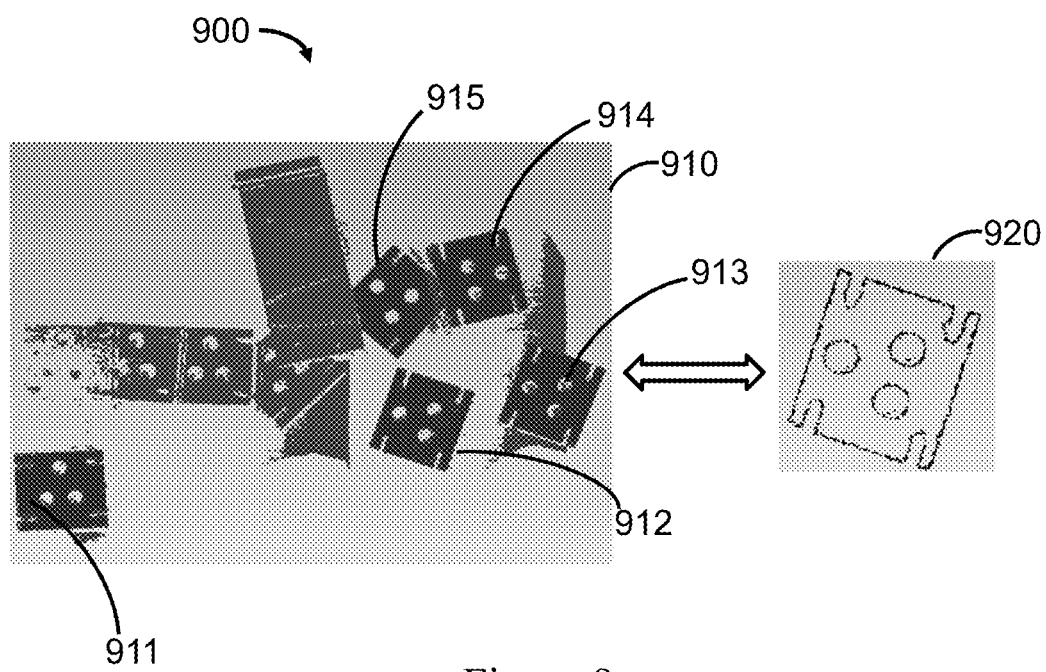
FIG. 9 illustrates a process of performing geometric filtering according to an embodiment of the present invention.

Additionally or alternatively, the geometric features describing the projected voxel planes may include a length-width ratio of rotated bounding box. As shown in FIG. 8 and FIG. 9, the rotated bounding box 820 is found for a 3D object projected in the 2D projection plane 810. The present invention does not limit the implementations of finding the rotated bounding box. A length-width ratio of rotated bounding box for a target 3D object 920 may be obtained or computed in the computerized apparatus as a target length-width ratio. After a rotated bounding box for each 3D object in a scanned 3D scene 910 projected in the 2D projection plane is found, a length-width ratio of respective rotated bounding box is calculated. By comparing this length-width ratio against the target length-width ratio, those 2D projection planes that do not approximately fit with it may be filtered out.

FIG. 9 illustrates a process 900 of resultant geometric filtering according to an embodiment of the present invention. After applying the geometric filter, those objects in a scanned 3D scene 910 that are similar to the target object 920 are identified. These are the objects labelled from 911 to 915 as shown in FIG. 9. Those objects that are very dissimilar to the target object 920 are filtered from the later processing, i.e. the other objects in the scanned scene 910. The geometric filtering provided by the present invention is based on voxel counting and the voxel counting can be done fast, thus the filtering efficiency is high.

Figure 10:
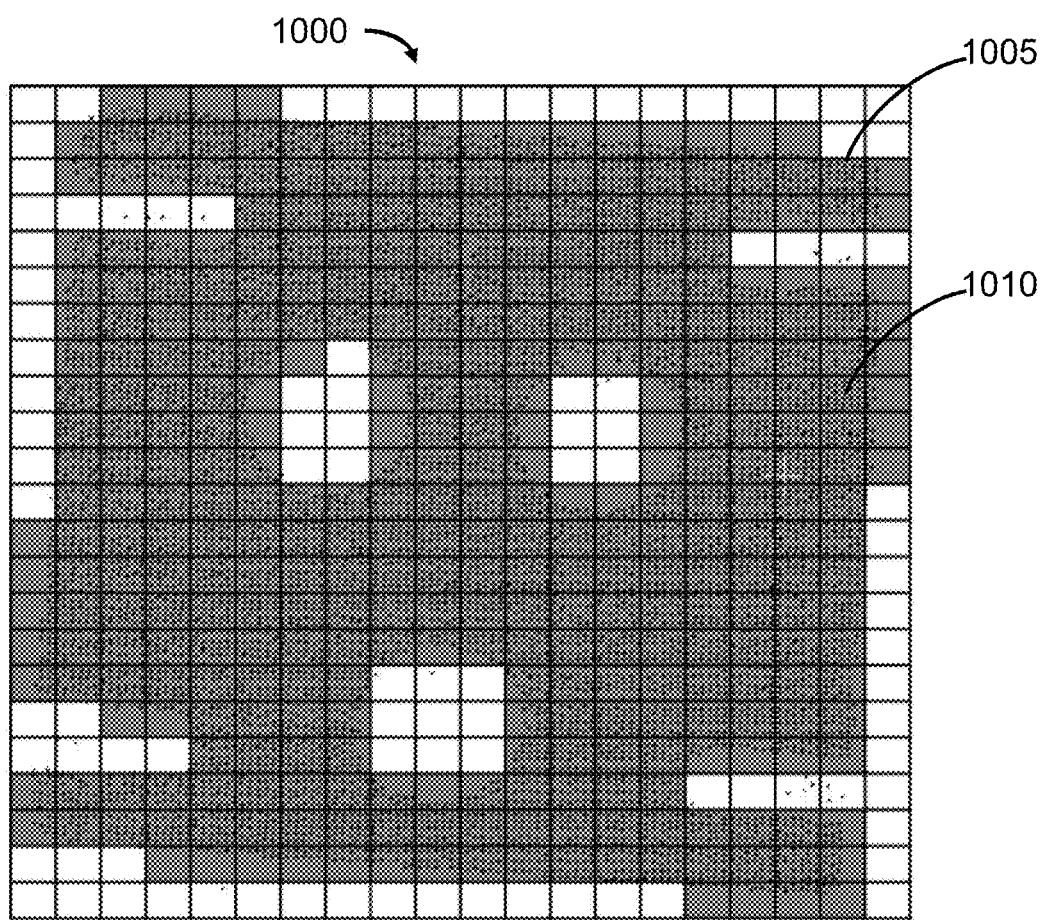
FIG. 10 shows a binarized projection plane according to an embodiment of the present invention.

In one embodiment, to facilitate extracting geometric features even faster, the plurality of projection voxels in each projected voxel plane are binarized as shown in FIG. 10, where a binarized 2D projection plane 1000 according to an embodiment of the present invention is illustrated. The binarization may be based on the number of points associated with each projection voxel. A projection voxel containing a number of points more than a third predefined threshold is assigned with a first binary value, and a projection voxel containing a number of points equal to or less than the threshold is assigned with a second binary value.

In one embodiment, the above filtering process 900 may be applied after each projected voxel plane of the 3D scene and the corresponding projected voxel plane of a target 3D object are binarized. As an example, the total number of binarized projection voxels having the first binary values within each projected voxel plane is counted as the projection count of the corresponding projected voxel plane. The total number of binarized target voxels having the first binary values within the target projected plane is also counted as the target count of the target projected voxel plane. Then if the absolute difference between a projected count and the target count exceeds a counting threshold, the corresponding projected voxel plane is eliminated.

According to an embodiment of the present invention, the edge detection process at 335 is performed on each binarized 2D projection plane derived from a scanned 3D scene. An example of which is shown in FIG. 10.

In a binarized 2D projection plane 1000, for each projection voxel, its neighboring projection voxels are examined. If a projection voxel has a binary value different from any of its neighboring projection voxels, this projection voxel is determined to be an edge projection voxel. Otherwise, it is determined as a non-edge projection voxel.

As an example, the projection voxel 1005 is identified as an edge projection voxel while the projection voxel 1010 is identified as a non-edge projection voxel.

Figure 11:
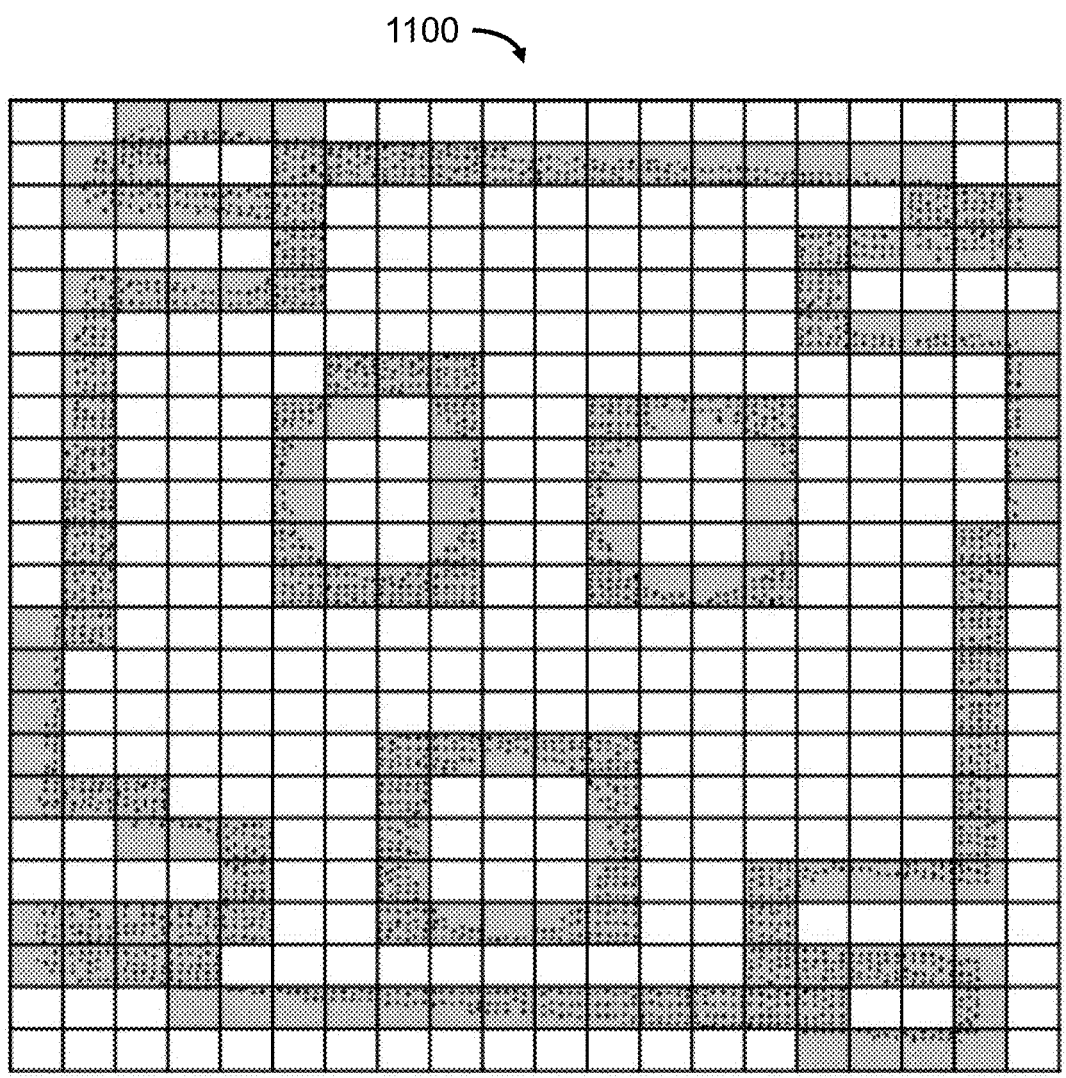
FIG. 11 illustrates a process of performing edge detection according to an embodiment of the present invention.

As a result, only the edge projection voxels in each projected voxel plane are retained as shown in FIG. 11, where the edge projection voxels in the plane 1100 are identified from the binarized 2D projection plane 1000. Those identified edge projection voxels are candidate voxels for edges. In this way, detection of edge projection voxels is very fast.

Figure 12:
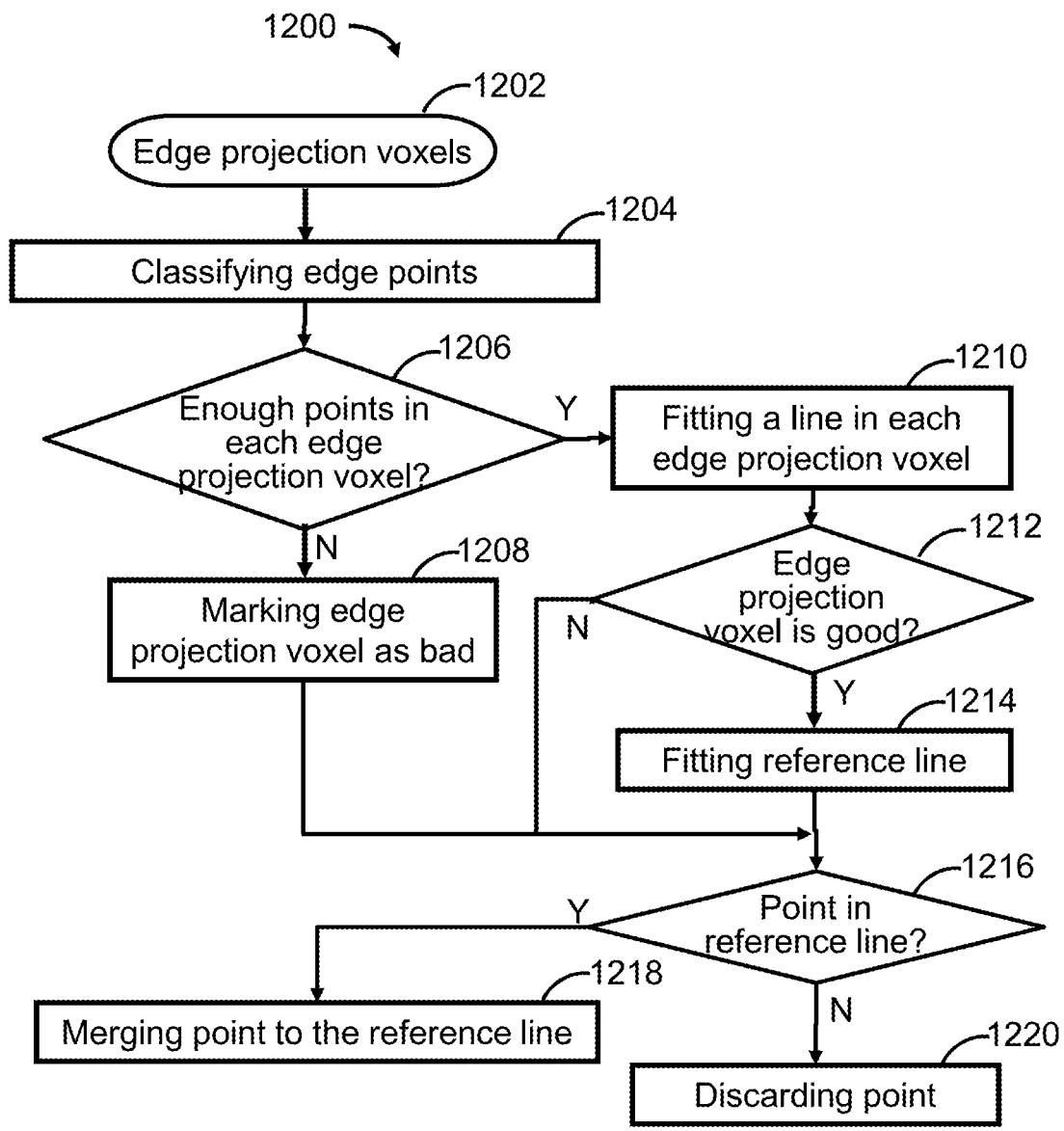
FIG. 12 is a flowchart of a method of hybrid voxel-point-based line extraction according to an embodiment of the present invention.
Figure 13A:
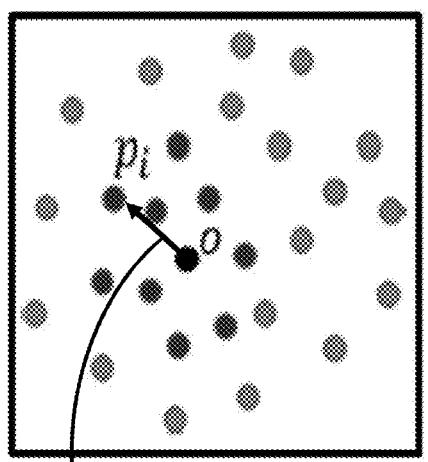
FIGS. 13*a* and 13*b* are diagrams showing the process of detecting an edge point according to an embodiment of the present invention.
Figure 13B:
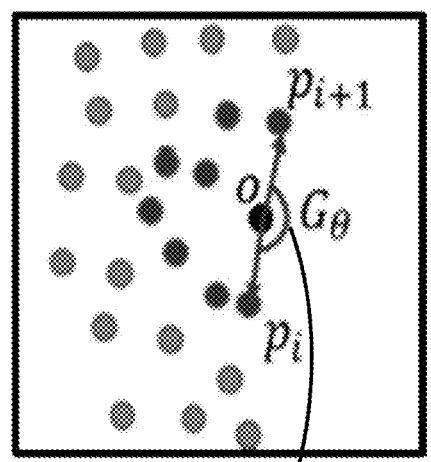
Figure 14:
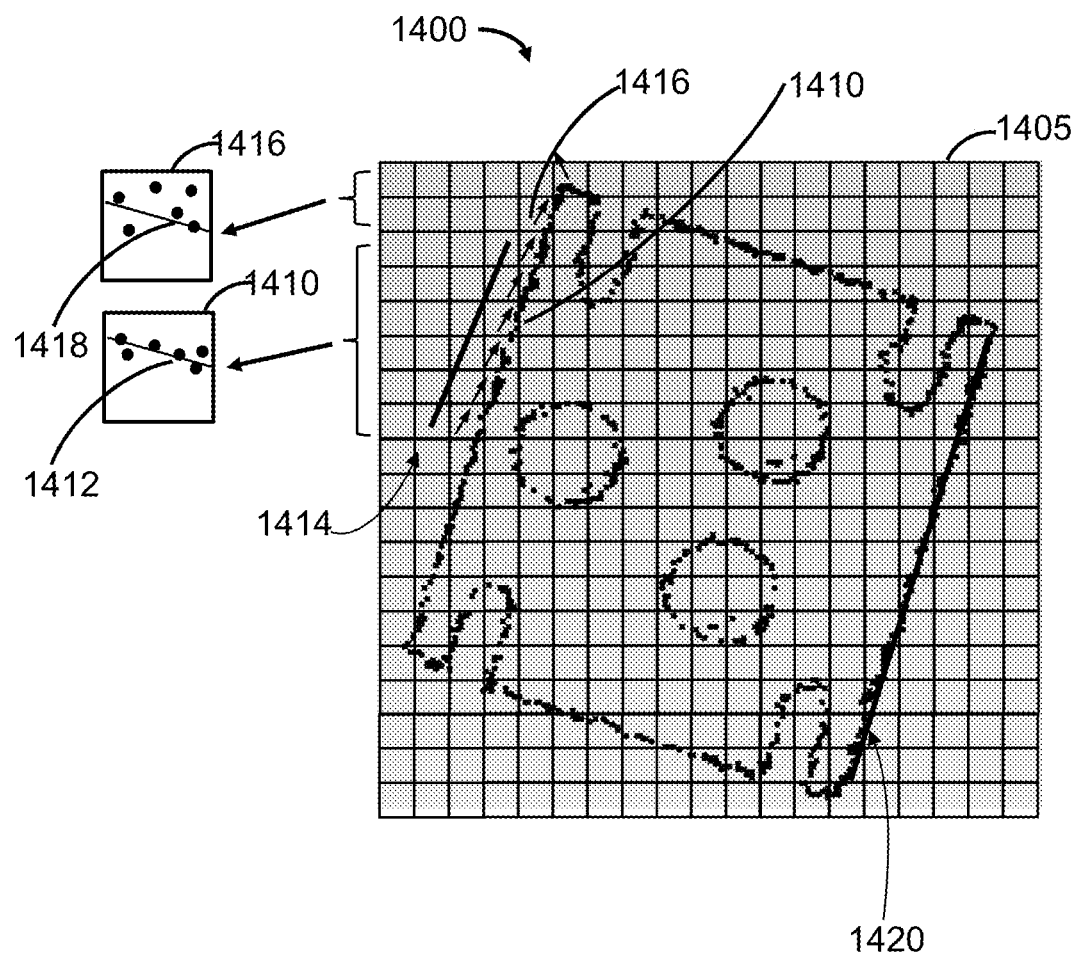
FIG. 14 illustrates a process for hybrid voxel-point-based line extraction according to an embodiment of the present invention.

FIG. 12-14 illustrate a procedure of hybrid voxel-point-based line extraction according to an embodiment of the present invention, which provides an exemplary implementation of the above step 340.

FIG. 12 shows a flowchart of a method 1200 of hybrid voxel-point-based line extraction according to an embodiment of the present invention. At 1202, the method 1200 starts with these identified edge projection voxels inputted for processing. At 1204, each point in each edge projection voxel is classified as an edge point if it satisfies an edge requirement, and only the edge points in each of the edge projection voxel are retained for further processing.

According to one embodiment, a subsampling method may be applied to the candidate edge projection voxels to determine whether each point within the edge projection voxel is an edge point or an interior point. FIGS. 13a and 13b illustrates the two cases. If a point is an interior point as shown in FIG. 13a, then the distribution of angles between the vector $OP_i$ 1310 and other neighboring points will be consecutive. But for an edge point as shown in FIG. 13b, at least one angular gap Go 1320 is substantial.

Returning to the method 1200, after the edge points in each projected voxel plane are detected, at steps of 1206-1212, each edge projection voxel in each projected voxel plane is classified into a first category or a second category based on a straight-line requirement. In other words, the edge projection voxels are labelled as a first category of edge projection voxels if the edge points inside these voxels satisfy the straight-line requirement and a second category of edge projection voxels if they do not satisfy the requirement. In this embodiment, a first category of voxels namely refers to good projection voxels and a second category of voxels namely refers to bad projection voxels.

In one embodiment of the present invention, the straight-line requirement comprises a first condition where the number of points inside the edge projection voxel is more than a fourth predefined threshold, and a second condition where the points inside the edge projection voxel exhibits a line structure. The line structure in one embodiment comprises a specific point on the line as well as a unit vector indicating the orientation of the line.

At 1206, whether there are enough edge points in each edge projection voxel is determined. If there are not enough points in an edge projection voxel, this edge projection voxel is marked as bad at 1208. On the other hand, if there are enough points in an edge projection voxel, at 1210, a line is fitted in this edge projection voxel using the edge points inside this voxel. In one embodiment, the mean value as well as the eigenvalues and eigenvectors of all these edge points within the projected voxel are computed, and based on these results, the straight line that best fits these points is obtained. In this case, the line structure comprises the mean value as the point on the line and an orientation determined by an eigenvector.

At 1212, the second condition of the straight-line requirement is further applied to the determination of whether an edge projection voxel is good or not. In one embodiment, a mean squared error (MSE) representing the average distance between each edge point in the edge projection voxel and the fitted line is computed. If the MSE is less than a second specified threshold, this edge projection voxel is determined to meet with second condition of the straight-line requirement and is marked as good. If the second condition is not met, then this edge projection voxel is marked as bad.

At 1214, neighboring good edge projection voxels are examined whether they satisfy a line-to-line requirement. in an attempt to form at least one reference line.

In one embodiment, the line-to-line requirement may comprise (a) the orientations of both lines are proximately the same and (b) the specific point in one good edge projection voxel proximates the line extended from the neighbor good edge projection voxel. When both conditions are met, the neighboring good edge projection voxels may be merged together to form a reference line. The line parameters of the reference line may be recomputed based on the combined points in the merged edge projection voxels.

At 1216, edge points in the bad edge projection voxels are checked if they can be fitted to at least one reference lines nearby. In the edge projection plane, a bad edge projection voxel may have a few neighbor edge projection voxels labelled as good. Each edge point in each bad edge projection voxel is associated with a neighboring good edge projection voxel if that specific neighboring line yields the best point-to-line match. In one embodiment, the point-to-line match computes a score that measures the perpendicular distance between the point to the reference line. In one embodiment, the best point-to-line match first computes distance between a point and a line of all its neighboring good voxels and retains those neighboring good voxels whose distance measures are less than a certain threshold. Then it selects the specific good voxel that yields the minimum distance measure as the winner.

At 1218, if an edge point in a bad edge projection voxel yields the best point-to-line match with a reference line, it is merged to that reference line. In one embodiment, the merging may be conducted by associating the edge point with the reference line. In the end, the reference lines are returned as exact lines extracted from the extracting step. If not, this point is discarded at 1220.

This method of hybrid voxel-point-based line extraction as described above not only reduces the processing speed but also improves measurement accuracy of the exact lines as well.

From a visual perspective, FIG. 14 illustrates a process 1400 for hybrid voxel-point-based line extraction according to an embodiment of the present invention. As shown in FIG. 14, a 2D plane 1405 may be one of the voxelized projection planes corresponding to a 3D scene including 3D object(s).

Projection voxel 1410 contains enough number of edge points, and these edge points exhibit a line structure 1412. As the points within projection voxel 1410 are close to the line structure 1412, the MSE value is small. When MSE is less than a the second specified threshold, this edge projection voxel is regarded as a good one, and the computed line structure 1412 is further used to produce a reference line 1414 together with other good projection voxels nearby. The reference line 1414 may be fitted by using all edge points in good neighbor projection voxels.

On the other hand, there may not be enough edge points inside projection voxel 1416 or the MSE value of all the edge points inside the projection voxel 1416 against the line 1418 is higher than the second specified threshold. In this case, for each edge point in the projection voxel 1418, the good neighbor projection voxel that yields the best point-to-line match is determined and this point is merged to the reference line of that good neighbor projection voxel. Thus the reference line is refined by point-by-point adding.

After the point cloud is processed with the process 1400, exact lines such as line 1420 in each projection plane 1405 is obtained. Once geometric features such as edges and lines are extracted from a 3D scene, posture, geometric dimension and shape measurements may be performed for each 3D object in the 3D scene.

Figure 15:
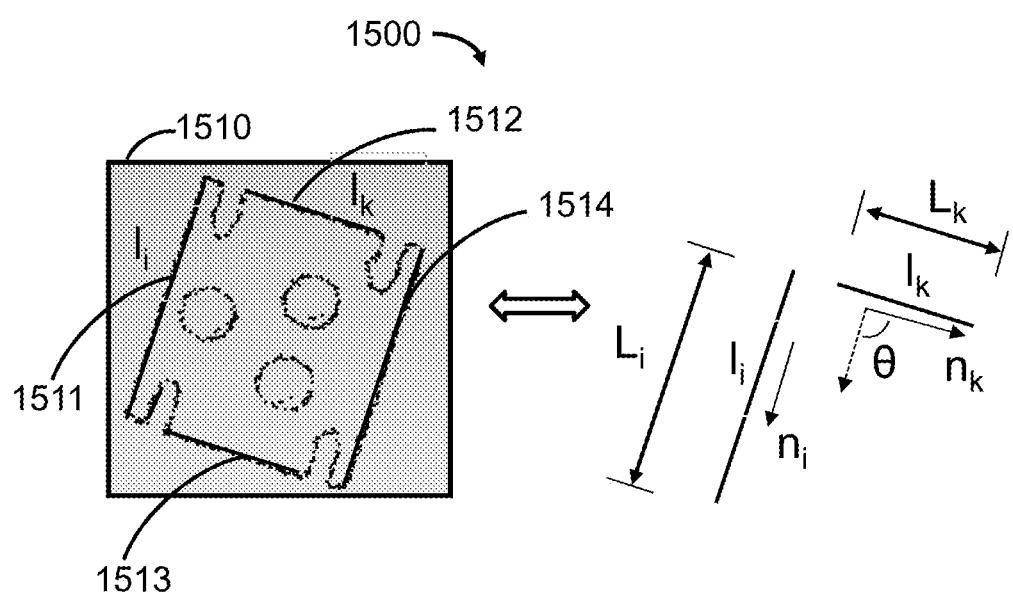
FIG. 15 illustrates a generation process of a line-to-line pair feature according to an embodiment of the present invention.

FIG. 15 illustrates a generation process 1500 of a line-to-line pair feature according to an embodiment of the present invention. For each projection plane, the exact lines corresponding to a 3D object are obtained, and line-to-line pair features are generated between any of two extracted lines within this projection plane.

As an example, lines 1511-1514 are extracted exact lines in a projection plane 1510. With consideration of line direction, angle between lines and line length ratio, a line-to-line pair feature may be generated for line $l_i$ and line $l_k$ as below.

$$F=(n_i, n_k, \theta, \lambda)$$

$$\lambda = |L_i - L_k| / \max(L_i, L_k)$$

where F represents the pair feature which is a function of line directions of the two lines, i.e., $n_i$ and $n_k$, an angle $\theta$ between two lines and a line length ratio $\lambda$. The line length ratio may be a ratio of the absolute line length difference as numerator and the longer line length between the pair of lines as denominator.

It should be appreciated that for four lines in a projection plane 1510, twelve pair features may be generated as described above. Each line pair in the same projection plane are computed using exactly extracted lines.

The generated pair features may be further used to align the 3D object identified in a 3D scene with target 3D objects. In order to do so, pair features of each target 3D object are generated as target pair features the same way as those of the actual 3D objects to be measured. Then at least one matching score is evaluated using the pair features for the actual 3D objects and the pair features for each target 3D object. If the maximum of the matching score is higher than a pre-defined threshold, a 3D object may be declared found or aligned with target 3D objects.

According to one embodiment of the present invention, a hash table and a voting scheme may be used to align the actual 3D objects and the target 3D objects with corresponding line-to-line pair features. The hash table allows efficient search for all line pairs on the target object that are similar to a given line pair from the 3D scene. It is a method that takes a line pair from the 3D scene as input and outputs a list of line pairs on the target object that are similar to the input line pair.

For a certain target 3D object, its line-to-line pair features are computed as described above for each pair of lines extracted from the target 3D object. Each line feature pair together with a coordinate basis describing a position of the line pair are used to create a hash table, where all the combinations of coordinate basis for each line pair are stored by index.

For a projection plane corresponding to a 3D object to be identified or aligned, its line-to-line pair features are computed as described above for each pair of lines extracted from the projection plane. The position of each pair is also computed in its own coordinate system. When searching for the hash table for each line pair of an actual object, for each entry found in the hash table, a vote is casted for the target object. The matching score is a function of the vote count. Hence an entry that received more than a certain number of votes corresponds to a potential match.

The line-to-line feature based object alignment according to the present invention implements pair features with the same projection plane, which allows a reduced hash table size and a shortened voting time. Furthermore, these pair features are generated using exact lines, thus it is robust to noise and measurement accuracy is thereby improved.

According to embodiments, the present invention discloses a methodology of processing huge amount of data points efficiently. The basic principle is to identify groups of data points that exhibit regular structures and organizes them as a group. And for those data points that do not fall into any of these groups, the methodology examines them one-by-one in order to recruit them to one of the existing groups. This is a much more efficient approach than processing each point in the data set individually and then attempt to merge adjacent points together when they exhibit similar properties.

Figure 16:
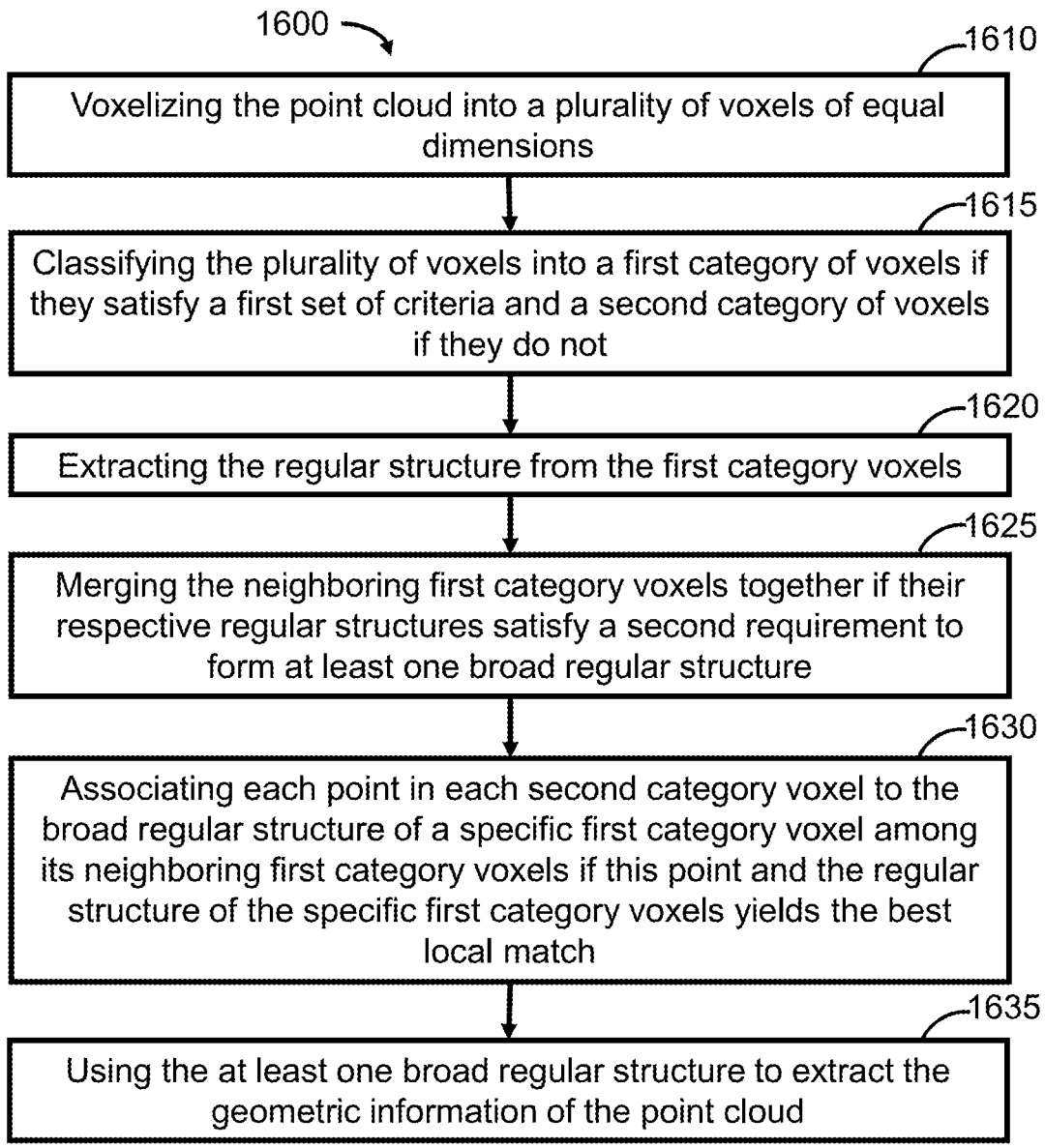
FIG. 16 illustrates a methodology of processing a large amount of data arranged in a point cloud according to an embodiment of the present invention.

FIG. 16 illustrates a methodology of process a large amount of data arranged in a point cloud. Step 1610 is to voxelize the point cloud into a plurality of voxels of equal dimensions. At 1615, each voxel is classified as first category of voxels or good voxels if they satisfy a first requirement. Otherwise, they are classified as second category of voxels or bad voxels. In one embodiment, the first requirement comprises two conditions. The first condition is that the number of points within the voxel is more than a pre-determined threshold and the second condition is that points within the voxel exhibit a regular structure. In a first embodiment, the points are 3D points, the first requirement is a planar requirement and the regular structure is a planar structure. In a second embodiment, the points are 2D points, the first requirement is a straight-line requirement and the regular structure is a line structure.

At 1620, the parameters of the regular structure from good voxels are computed. For the planar structure, they correspond to the planar parameters which comprises a normal vector and an offset. While for the line structure, the regular structure parameters comprise a specific point on the line and a line orientation.

At 1625, the neighbors of good voxels are examined. If the regular structures of both a good voxel and its neighboring good voxels satisfy a second requirement, then the neighboring good voxels are merged together to form at least one broad regular structure. For the first embodiment, the second requirement is a plane-to-plane requirement and the broad regular structure is another planar structure while for the second embodiment, the second requirement is the line-to-line requirement and the corresponding broad regular structure is another line structure.

At 1630, the neighboring good voxels adjacent to a bad voxel are first identified. Then for each point in a bad voxel, a local match between this point and its neighboring good voxels is evaluated. The good voxel yielding the best local match score is selected and this point is associated with broad regular structure that the selected good voxel belongs to.

In one embodiment, the local match first computes distance measures between a point and the regular structures of all its neighboring good voxels and retains those neighboring good voxels whose distance measures are less than a certain threshold. Then it selects the specific good voxel that yields the minimum distance measure as the winner that yields the best local match score.

In the first embodiment, the local match is a point-to-plane match and the distance measure is the absolute distance between a point and the plane. In the second embodiment, the local match is a point-to-line match and the distance measure is the absolute distance between this point and the line.

Finally, at 1635, the at least one broad regular structure are obtained. They are referred as common planes in the first embodiment and reference lines in the second embodiment.

This methodology combines voxel-based processing and point-based processing together to become a hybrid voxel-point-based approach. As there are efficient algorithms to identify a regular structure for points within a voxel, the good voxels can be quickly identified from the voxel-based point cloud. For those bad voxels, it is not advantageous to just discard all the points within it. This may result in substantial information loss. On the other hand, each point within the bad voxels needs to be examined individually. By associating the points inside the bad voxels to their neighboring good voxels, the end points of a plane or a straight-line can be more accurately determined. This is especially important for determining the plane bounding box and line-to-line pair features. As such, this hybrid approach as disclosed in this invention offers high accuracy in geometric measurements at substantially fast processing speed over the existing approaches.

With the present invention, an efficient, fully automated, easy-to-use 3D computer processing method and system can be used in real-time and works on multiple platforms. As described in greater detail above, the advantageous techniques described herein is tolerant to noise and occlusions typically found in the real world. Further, the entire process is fully automated, alleviating the need for manual post-processing to form complete, accurate, fully-formed 3D models suitable for many commercial and consumer applications. The methods and systems described herein are designed to run efficiently on low cost, low power, System on Chip (SoC)-based processor platforms—such as ARM processors that run Android™/Linux™ operating systems.

Figure 17:
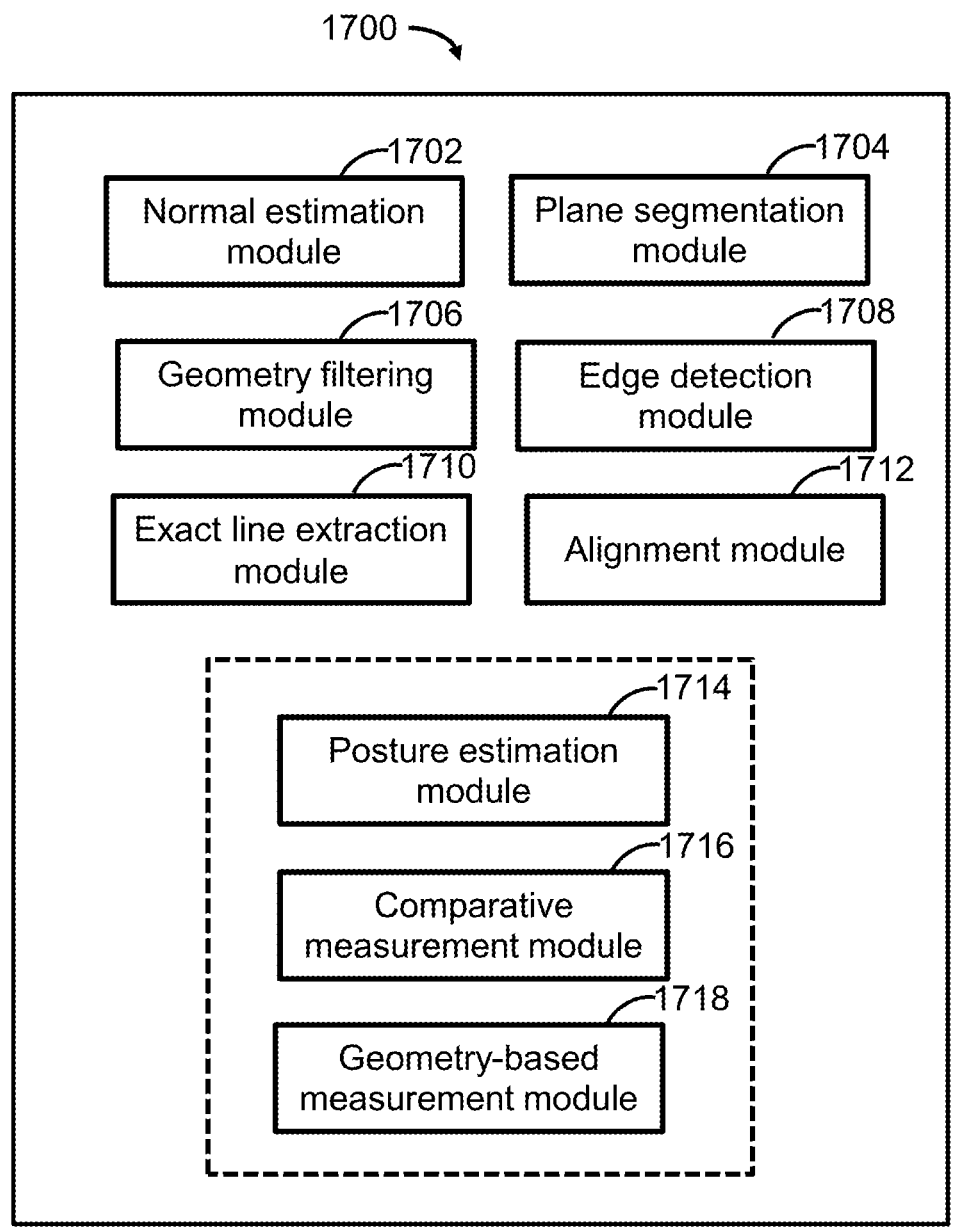
FIG. 17 is a schematic software diagram of a computerized apparatus for posture, dimension and shape measurements of at least one 3D object in a scanned 3D scene according to embodiments of the present.

FIG. 17 is a schematic diagram of a computerized apparatus 1700 for posture, dimension and shape measurements of at least one 3D object in a scanned 3D scene according to embodiments of the present invention. The computerized apparatus 1700 is operable to perform the methods/processes 200-1500 described with reference to FIGS. 2-15.

To this end, the computerized apparatus 1700 comprises a normal estimation module 1702 configured to voxelize a point cloud of a scanned 3D scene into a plurality of voxels of equal dimensions, where the scanned 3D scene comprises at least one 3D object represented by a plurality of points in the point cloud, classify the plurality of voxels into a first category of voxels if they satisfy a planar requirement and a second category of voxels if they do not satisfy the planar requirement. Then for each voxel in the first category, it computes at least one plane parameter of a plane that fits the points inside the voxel and for each voxel in the second category it computes the normal vector of each point in the voxel. Further, the computerized apparatus 1700 comprises a plane segmentation module 1704 configured to grow at least one common plane for the plurality of voxels based on the computed normal vectors and create at least one projected voxel plane comprising a plurality of projection voxels for each of the at least one common plane; an edge detection module 1708 configured to perform edge detection on each of the at least one projected voxel plane to obtain edge projection voxels on each corresponding at least one projected voxel plane; and an exact line extraction module 1710 configured to extract lines from the edge projection voxels in each of the at least one projected voxel plane.

In some embodiments, the computerized apparatus 1700 further comprises a geometric filtering module 1706 configured to perform geometric filtering to filter out unwanted portion of the scanned 3D scene that does not include a target 3D object by examining each projected voxel plane and eliminating those projected voxel planes that do not satisfy the at least one geometric feature related to the target 3D object.

In some embodiments, the computerized apparatus 1700 further comprises a posture estimation module 1714, and/or a comparative measurement module 1716, and/or a geometry-based measurement module 1718. The posture estimation module 1714 is configured to compute posture (rotation and translation) for an actual 3D object from a target 3D object. The comparative measurement module 1716 is configured to compute difference between an actual 3D object being rotated and translated by the posture estimation module 1714 and a target 3D object. The geometry-based measurement module 1718 is configured to conduct dimension and shape measurements for an actual 3D object in 3D scenes based on the results of 3D geometric feature extraction such as from the exact line extraction module 1710 for various applications.

The apparatus or system and method of the present invention may be implemented in the form of a software application running on a computerized system. Further, portions of the methods may be executed on one such computerized system, while the other portions are executed on one or more other such computerized systems. Examples of the computerized system include a mainframe, personal computer, handheld computer, server, etc. The software application may be stored on a recording media locally accessible by the computer system and accessible via a hard wired or wireless connection to a network, for example, a local area network, or the Internet.

The computerized system may include, for example, a processor, random access memory (RAM), a printer interface, a display unit, a local area network (LAN) data transmission controller, a LAN interface, a network controller, an internal bus, and one or more input devices, for example, a keyboard, mouse etc. The computerized system can be connected to a data storage device.

Figure 18:
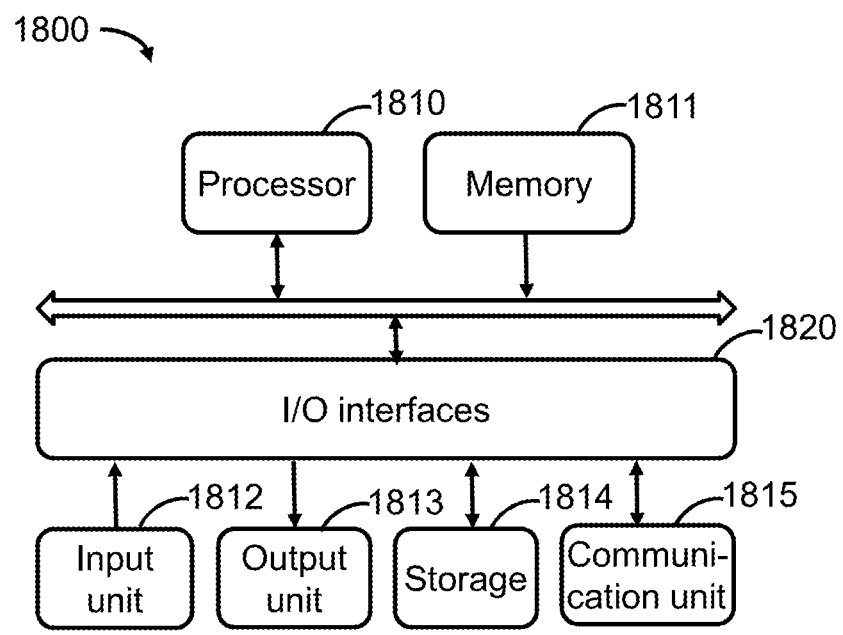
FIG. 18 is a schematic diagram of a computerized system for posture, dimension and shape measurements of at least one 3D object in a scanned 3D scene according to an embodiment of the present invention.

The apparatus or system and method of the present disclosure may be implemented in the form of a software application running on a computerized system. FIG. 18 is a schematic diagram of a computerized system 1800 for posture, dimension and shape measurements of at least one 3D object in a scanned 3D scene according to an embodiment of the present invention, consisting of both the hardware and software components that can be used to implement the embodiments of the present invention.

The hardware components in the present embodiment further comprises the processor 1810, memory 1811 and multiple interfaces. A plurality of components in the computerized system 1800 is connected to the I/O interface 1820, including input unit 1812, output unit 1813, storage unit 1814 and communication unit 1815, which include, but not limit to, network card, modem, radio communication transceiver etc. In another embodiment, the present disclosure may also be deployed in a distributed computing environment that includes more than one computerized system 1800 connected together through one or more networks. The networks can include one or more of the internet, an intranet, an extranet, a cellular network, a local area network (LAN), a home area network (HAN), metropolitan area network (MAN), a wide area network (WAN), a Bluetooth network, public and private networks, etc.

The processor 1810 can be a central processing unit (CPU), microprocessor, microcontrollers, digital signal processor (DSP), field programmable gate arrays (FPGA), application-specific integrated circuits (ASIC), etc., for controlling the overall operation of memory (such as random access memory (RAM) for temporary data storage, read only memory (ROM) for permanent data storage, and firmware). One or more processors can communicate with each other and memory and perform operations and tasks that implement one or more blocks of the flow diagrams discussed herein.

The memory 1811, for example, stores applications, data, programs, algorithms (including software to implement or assist in implementing example embodiments) and other data. Memory 1811 can include dynamic or static random-access memory (DRAM or SRAM) or read-only memory such as Erasable and Programmable Read-Only Memories (EPROMs), Electrically Erasable and Programmable Read-Only Memories (EEPROMs) and flash memories, as well as other memory technologies, singly or jointly combined. In some embodiments, the processor 1810 can be configured to execute the above described various procedures and processing, such as methods/processes 200-1500 described with reference to FIGS. 2-15.

The storage 1814 typically includes persistence storage such as magnetic disks such as fixed and removable disks; other magnetic media including tape; optical media such as Compact Disks (CDs) or Digital Versatile Disks (DVDs), and semiconductor storage devices such as flash memory cards, solid-state drive, EPROMs, EEPROMS or other storage technologies, singly or in combination. Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

The input unit 1812 is the interfacing components that connect the computerized system 1800 to data input devices such as keyboard, keypad, pen-based device, mouse or other point devices, voice-input apparatus, scanner or other input technologies. According to an embodiment of the present invention, the input unit 1812 may include at least one 3D sensor which captures a 3D scene for providing 3D data of the 3D scene to the computerized system 1800. The output unit 1813 is the interfacing components for the computerized system 1800 to send data to the output devices such as a CRT or flat panel display monitor, printer, voice output apparatus, laud speaker or other output technologies. The communication unit 1815 may typically include the serial or parallel interface and the USB (Universal Serial Bus) interfaces, and other interfacing technologies. The communication unit 1815 may also enables the computerized system 1800 to exchange information with external data-processing devices via a data communication network such as the Personal Area Network (PAN), the Local Area Network (LAN), the Wide Area Network (WAN), the Internet, and other data communication network architectures. The communication unit 1815 can include the Ethernet interface, the Wireless LAN interface device, the Bluetooth interfacing device and other networking devices, singly or in combination.

Software further includes the operating system, and the application software systems as shown in FIG. 17. Operating system is to manage all the hardware resources, and schedule executing priorities for all tasks and processes so that the four application software systems can all be executed in an orderly manner.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the application software systems may be executed in a distributed computing environment. The software program and its related databases can be stored in a separate file server or database server and is transferred to the local host for execution. The computerized system 1800 as shown in FIG. 18 is therefore an exemplary embodiment of how the present invention can be implemented. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A computer implemented method for posture, dimension and shape measurements of at least one 3D object in a scanned 3D scene, comprising:
   receiving a point cloud of a scanned 3D scene, the scanned 3D scene comprising at least one 3D object represented by a plurality of points in the point cloud;
   voxelizing the point cloud into a plurality of voxels of equal dimensions;
   classifying the plurality of voxels into a first category of voxels if they satisfy a planar requirement and a second category of voxels if they do not satisfy the planar requirement;
   for each voxel in the first category, computing at least one planar parameter of a plane that fits the points inside the voxel;
   for each voxel in the second category, computing the normal vector of each point in the voxel;
   growing at least one common plane for the plurality of voxels based on the computed at least one planar parameter of the first category voxels and the normal vector of each point in the second category voxels;
   creating at least one projected voxel plane for each of the at least one common plane, the at least one projected voxel plane comprising a plurality of projection voxels;
   performing edge detection on each of the at least one projected voxel plane to obtain edge projection voxels on each corresponding at least one projected voxel plane;
   extracting lines from the edge projection voxels in each of the at least one projected voxel plane; and
   connecting lines together to form an object for each of the at least one projected voxel plane for the posture, dimension and shape measurements of the 3D object in the scanned 3D scene.

2. The method according to claim 1, wherein the planar requirement comprises the following conditions:
   the number of points inside the voxel is more than a first predefined threshold, and
   the points inside the voxel exhibit a planar structure.

3. The method according to claim 1, wherein the step of growing at least one common plane for the plurality of voxels comprises:
   merging neighbor voxels in the first category of voxels to form the at least one common plane if the neighbor voxels satisfy a plane-to-plane requirement; and
   for each point in a voxel in each second category,
      identifying first category voxels in the neighborhood of this second category voxel as neighbor voxels;
      retrieving the planes of the neighbor voxels as neighbor planes; and
      associating the point to one of the neighbor planes if that specific neighbor plane yields the best point-to-plane match among the neighbor planes;
   wherein a point-to-plane match is a function of the distance of a point to a plane and the proximity of the normal vector of the point against the normal vector of the plane, and the best point-to-plane match is met if the distance of the point to the specific neighbor plane is the least distance among the distances obtained from the point to the neighbor planes.

4. The method according to claim 3, wherein the plane-to-plane requirement comprises the following conditions:
   the normal vector of the neighbor voxels in the first category are proximately equal; and
   the absolute difference of their offsets is smaller than a second predefined threshold;
   wherein the at least one planar parameter comprises a normal vector and an offset that represents the plane.

5. The method according to claim 1, wherein creating at least one projected voxel plane from the at least one common plane comprises:
   projecting the points that are associated with the at least one common plane in a 2D projection plane perpendicular with the normal vector of the at least one common plane;
   voxelizing the 2D projection plane into the plurality of projection voxels of equal size; and
   binarizing the plurality of projection voxels based on the number of points associated with each projection voxel to obtain binarized projection voxel;
   wherein each binarized projection voxel is represented by a first binary value if the number of points associated with each projection voxel is higher than a third predefined threshold and
   each binarized projection voxel is represented by a second binary value if the number of points associated with each projection voxel is lower than or equal to the third predefined threshold.

6. The method according to claim 5, further comprising:
   obtaining a projected voxel plane of a target 3D object as a 2D target projected plane; and
   performing geometric filtering to filter out unwanted portion of the scanned 3D scene that does not include the target 3D object by
      examining each projected voxel plane; and
      eliminating those projected voxel planes that do not satisfy the at least one geometric feature related to the target 3D object.

7. The method according to claim 6, wherein the examining step further comprises:
   counting the total number of binarized projection voxels having the first binary values within the at least one projected voxel plane as the projection count of the corresponding projected voxel plane;
   binarizing the plurality of projection voxels in the target projected plane based on the number of points associated with each projection voxel in the target projected voxel plane to obtain binarized target voxels;
   counting the total number of binarized target voxels having the first binary values within the target projected plane as the target count of the target projected voxel plane; and
   discarding the projected voxel plane if the absolute difference between the corresponding projected count and the target count exceeds a counting threshold.

8. The method according to claim 5, wherein performing edge detection on the at least one projected voxel plane to obtain edge projection voxels comprises:
   determining if each projection voxel in the at least one projected voxel plane is an edge projection voxel by comparing each projection voxel with its all neighboring projection voxels and identifying each projection voxel that has a binary value different from any of its neighboring projection voxels as an edge projection voxel; and retaining only the edge projection voxels in the at least one projected voxel plane.

9. The method according to claim 8, wherein the extracting step further comprises:

classifying each point in each edge projection voxel as an edge point if it satisfies an edge requirement and retaining only the edge points in each of the edge projection voxel;

labelling the edge projection voxels as a first category of edge projection voxels if the edge points inside these voxels satisfy a straight-line requirement and a second category of edge projection voxels if they do not satisfy the straight-line requirement;

growing at least one reference line from at least two of the neighboring first category edge projection voxels if they meet a line-to-line requirement; and associating each edge point in each second category edge projection voxel to a specific neighboring first category edge projection voxel if the line of that specific neighboring first category edge projection voxel yields the best point-to-line match among lines of all its neighboring first category edge projection voxels; and returning the at least one reference line as the lines extracted from the extracting step;

wherein a point-to-line match computes a score that measures a perpendicular distance between a point to the reference line, and the best point-to-line match is met if the distance between the point to the line of that specific neighboring first category edge projection voxel yields the minimum distance among the distances between the point and lines of all its neighboring first category edge projection voxels.

10. The method according to claim 9, wherein the straight-line requirement comprises the following conditions:

the number of points inside the edge projection voxel is more than a fourth predefined threshold, and the points inside the edge projection voxel exhibits a line structure;

wherein the line-to-line requirement comprises the following conditions:

the orientations of the two fitted lines are proximately same; and a point on the line of a first-category edge projection voxel proximates the line extended from the neighbor first-category edge projection voxel, and wherein the point-to-line match is a function of the distance of a point to a fitted line.

11. The method according to claim 1, further comprising:

generating a first set of line-to-line pair features from the lines extracted from the at least one projected voxel plane; and obtaining a second set of line-to-line pair features for each of the at least one target 3D object, evaluating at least one matching score using the first set of line-to-line features and the second set of line-to-line features for each at least one target 3D object;

identifying a 3D object in the 3D scene as one of the at least one target 3D object if the maximum of the matching score is higher than a fifth predefined threshold; and aligning the 3D object with the target 3D object.

12. The method according to claim 11, wherein the line-to-line pair feature comprises at least one parameter of two lines, of which one parameter is a ratio wherein the numerator of the ratio is the absolute difference of the lengths of two lines and the denominator is the maximum length between these two lines.

13. The method according to claim 11, wherein the generating step further comprises:

generating the line-to-line pair feature for each line pair as below $F=(n_i,n_k,\theta,\lambda)$ $\lambda=|L_i-L_k|/\max(L_i,L_k)$ where F represents the pair feature of $l_i$ and line $l_k$, which is a function of line directions of the two lines, $n_i$ is the line direction of line $l_i$, and $n_k$ is the line direction of line $l_k$, $\theta$ is the angle between line $l_i$ and line $l_k$, $L_i$ is the length of line $l_i$; $L_k$ is the length of line $l_k$; and $\lambda$ is a ratio of the absolute line length difference $|L_i-L_k|$ and the longer line length between line $l_i$, and line $l_k$ ($\max(L_i,L_k)$).

14. The method according to 11, further comprising:

performing posture estimation on the found 3D objection based on the alignment with the at least one target 3D object.

15. A computerized system comprising:

A processor;

A memory coupled to the processor, the memory and the processor together configured to cause the computerized system to perform actions comprising:

receiving a point cloud of a scanned 3D scene, the scanned 3D scene comprising at least one 3D object represented by a plurality of points in the point cloud;

voxelizing the point cloud into a plurality of voxels of equal dimensions;

classifying the plurality of voxels into a first category of voxels if they satisfy a planar requirement and a second category of voxels if they do not satisfy the planar requirement;

for each voxel in the first category, computing at least one planar parameter of a plane that fits the points inside the voxel;

for each voxel in the second category, computing the normal vector of each point in the voxel;

growing at least one common plane for the plurality of voxels based on the computed at least one planar parameter of the first category voxels and the normal vector of each point in the second category voxels;

creating at least one projected voxel plane for each of the at least one common plane, the at least one projected voxel plane comprising a plurality of projection voxels;

performing edge detection on each of the at least one projected voxel plane to obtain edge projection voxels on each corresponding at least one projected voxel plane;

extracting lines from the edge projection voxels in each of the at least one projected voxel plane; and connecting lines together to form an object for each of the at least one projected voxel plane for posture, dimension and shape measurements of the 3D object in the scanned 3D scene.

16. A computerized system according to claim 15, further comprising at least one 3D sensor to capture a 3D scene for providing 3D data of the 3D scene to the computerized system.

* * * * *